US006962466B2

(12) United States Patent
Vinegar et al.

(10) Patent No.: US 6,962,466 B2
(45) Date of Patent: Nov. 8, 2005

(54) SOIL REMEDIATION OF MERCURY CONTAMINATION

(75) Inventors: Harold J. Vinegar, Bellaire, TX (US); George L. Stegemeier, Houston, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 0 days.

(21) Appl. No.: 10/279,758

(22) Filed: Oct. 24, 2002

(65) Prior Publication Data

US 2004/0120771 A1 Jun. 24, 2004

Related U.S. Application Data

(60) Provisional application No. 60/336,325, filed on Oct. 24, 2001.

(51) Int. Cl.⁷ ................................ B09C 1/00
(52) U.S. Cl. .................. 405/128.4; 405/128; 405/85
(58) Field of Search ................ 405/128.1, 128.15, 405/128.2, 128.25, 128.3, 128.35, 128.4, 128.6, 128.7, 128.8, 128.85

(56) References Cited

U.S. PATENT DOCUMENTS

| | | | |
|---|---|---|---|
| 2,777,679 A | 1/1957 | Ljunstrom | |
| 3,684,037 A | 8/1972 | Bodine | |
| 4,017,309 A | 4/1977 | Johnson | |

(Continued)

FOREIGN PATENT DOCUMENTS

| | | |
|---|---|---|
| DE | 198 24 930 | 9/1992 |
| DE | 196 48 928 | 4/1998 |
| DE | 19707 096 | 5/1998 |
| DE | 198 01 321 | 7/1999 |
| DE | 199 27 134 | 12/2000 |
| EP | 592 225 | 4/1994 |
| GB | 1 366 357 | 9/1974 |
| WO | 98/52704 | 11/1998 |

OTHER PUBLICATIONS

US Army Corps of Engineers Pamphlet EP 415–1–261, 1997, chapter 6.*
U.S. Appl. No. 09/549,902 to Vinegar et al. entitled, "Vapor Collection and Treatment of Off–Gas From an In–Situ Thermal Desorption Soil Remediation".
U.S. Appl. No. 10/279,771 to Stegemeier et al. entitled "Thermally Enhanced Soil Decontamination Method".
U.S. Appl. No. 10/280,102 to Vinegar et al. entitled "Isolation of Soil With a Low Temperature Barrier Prior to Conductive Thermal Treatment of the Soil".
Vinegar et al.; "In Situ Thermal Desorption of Soils Impacted with Chlorinated Solvents"; 1999; 23 pgs.
Vinegar et al.; "In Situ Thermal Desorption using Thermal Wells and Blankets"; 1998; 1 pg.

(Continued)

Primary Examiner—John Kreck
(74) Attorney, Agent, or Firm—Meyertons, Hood, Kivlin, Kowert & Goetzel, P.C.; Eric B. Meyertons

(57) ABSTRACT

An in situ soil remediation system may be used to remove or reduce levels of mercury contamination within soil. The soil remediation system may also remove or reduce levels of other contaminants within the soil. Mercury may be vaporized within the soil by a heating system. The vaporized mercury may be removed from the soil by a vacuum system. The vaporized mercury may pass through heated risers that elevate the vaporized mercury. After the vaporized mercury passes from the heated risers, the vaporized mercury may be allowed to cool, condense, and flow downward to a treatment facility. Removing mercury from the soil as a vapor may provide an economical, safe, and efficient way to remediate mercury contaminated soil.

57 Claims, 6 Drawing Sheets

U.S. PATENT DOCUMENTS

| | | | |
|---|---|---|---|
| 4,276,164 A | | 6/1981 | Martone et al. |
| 4,380,930 A | | 4/1983 | Podhrasky et al. |
| 4,423,323 A | | 12/1983 | Ellis et al. |
| 4,500,327 A | * | 2/1985 | Nishino et al. ............... 95/134 |
| 4,577,503 A | | 3/1986 | Imaino et al. |
| 4,598,392 A | | 7/1986 | Pann |
| 4,641,028 A | * | 2/1987 | Taylor et al. ............... 250/266 |
| 4,704,514 A | | 11/1987 | Van Egmond et al. |
| 4,842,448 A | * | 6/1989 | Koerner et al. ......... 405/128.35 |
| 4,860,544 A | | 8/1989 | Krieg et al. |
| 4,974,425 A | * | 12/1990 | Krieg et al. ................. 62/45.1 |
| 4,984,594 A | * | 1/1991 | Vinegar et al. ............... 134/21 |
| 5,067,852 A | | 11/1991 | Plunkett |
| 5,076,727 A | | 12/1991 | Johnson et al. |
| 5,114,497 A | | 5/1992 | Johnson et al. |
| 5,169,263 A | | 12/1992 | Johnson et al. |
| 5,190,405 A | | 3/1993 | Vinegar et al. |
| 5,193,934 A | | 3/1993 | Johnson et al. |
| 5,209,604 A | | 5/1993 | Chou |
| 5,221,827 A | | 6/1993 | Marsden, Jr. et al. |
| 5,228,804 A | | 7/1993 | Balch |
| 5,229,583 A | | 7/1993 | van Egmond et al. |
| 5,232,951 A | * | 8/1993 | Pfingstl et al. .............. 518/702 |
| 5,233,164 A | | 8/1993 | Dicks et al. |
| 5,244,310 A | | 9/1993 | Johnson |
| 5,249,368 A | | 10/1993 | Bertino et al. |
| 5,271,693 A | | 12/1993 | Johnson et al. |
| 5,305,239 A | | 4/1994 | Kinra |
| 5,318,116 A | * | 6/1994 | Vinegar et al. ............... 166/60 |
| 5,348,422 A | | 9/1994 | Manchak, III et al. |
| 5,360,067 A | | 11/1994 | Meo, III |
| 5,362,397 A | | 11/1994 | Cyr |
| 5,403,119 A | | 4/1995 | Hoyle |
| 5,435,666 A | * | 7/1995 | Hassett et al. ......... 405/128.45 |
| 5,545,803 A | | 8/1996 | Heath et al. |
| 5,553,189 A | | 9/1996 | Stegemeier et al. |
| 5,569,154 A | | 10/1996 | Navetta |
| 5,656,239 A | | 8/1997 | Stegemeier et al. |
| 5,660,500 A | * | 8/1997 | Marsden et al. ......... 405/128.4 |
| 5,674,424 A | | 10/1997 | Iben et al. |
| 5,753,494 A | | 5/1998 | Hater et al. |
| 5,779,762 A | | 7/1998 | Kohr et al. |
| 5,836,718 A | | 11/1998 | Price |
| 5,997,214 A | | 12/1999 | de Rouffignac et al. |
| 6,039,508 A | | 3/2000 | White |
| 6,102,622 A | | 8/2000 | Vinegar et al. |
| 6,419,423 B1 | | 7/2002 | Vinegar et al. |
| 6,543,539 B1 | | 4/2003 | Vinegar et al. |
| 6,632,047 B2 | | 10/2003 | Vinegar et al. |
| 6,688,387 B1 | | 2/2004 | Wellington et al. |
| 2003/0110794 A1 | | 6/2003 | Stegemeier et al. |
| 2003/0136558 A1 | | 7/2003 | Wellington et al. |
| 2003/0192691 A1 | | 10/2003 | Vinegar et al. |
| 2004/0120772 A1 | | 6/2004 | Vinegar et al. |
| 2004/0126190 A1 | | 7/2004 | Stegemeier et al. |

OTHER PUBLICATIONS

Conley et al.; "In Situ Thermal Desorption of Refined Petroleum Hydrocarbons from Saturated Soil"; 2000; pp. 1–10.

Hansen et al.; "In Situ Thermal Desorption of Coal Tar"; 1998; pp. 1–22.

Vinegar et al.; "Remediation of Deep Soil Contamination using Thermal Vacuum Wells"; Society of Petroleum Engineers; 1997; pp. 905–918.

Heron et al., "Soil Heating for Enhanced Remediation of Chlorinated Solvents: A Laboratory Study on Resistive Heating and Vapor Extraction in a Silty, Low–Permeable Soil Contaminated with Trichloroethylene"; Environmental science & Technology; 1998; 32(10); pp. 1474–1481.

International Search Report for PCT/US02/34199 mailed Jul. 2, 2003, 8 pages.

International Search Report for PCT /US02/34273 mailed Feb. 18, 2003, 3 pages.

International Search Report for PCT /US02/34532 mailed Aug. 5, 2003, 3 pages.

* cited by examiner

SOIL REMEDIATION OF MERCURY CONTAMINATION

PRIORITY CLAIM

This application claims priority to U.S. Provisional Application No. 60/336,325 entitled "Soil Remediation of Mercury Contamination," filed Oct. 24, 2001. The above-referenced provisional application is hereby incorporated by reference as if fully set forth herein.

BACKGROUND OF THE INVENTION

1. Field of the Invention

The present invention generally relates to treatment of contaminated soil. An embodiment of the invention relates to in situ thermal desorption soil remediation of mercury contaminated soil.

2. Description of Related Art

Contamination of soil has become a matter of concern in many locations. "Soil" refers to unconsolidated and consolidated material in the ground. Soil may include natural formation material such as dirt, sand, and rock, as well as other material, such as fill material. Soil may become contaminated with chemical, biological, and/or radioactive contaminants. Contamination of soil may occur in a variety of ways, such as material spillage, leakage from storage vessels, and landfill seepage. Additional public health concerns arise if the contaminants migrate into aquifers or into air. Soil contaminants may also migrate into the food supply through bioaccumulation in various species in a food chain.

There are many methods to remediate contaminated soil. "Remediating soil" means treating the soil to remove soil contaminants or to reduce contaminants within the soil (e.g., to acceptable levels). A method of remediating a contaminated site is to excavate the soil and to process the soil in a separate treatment facility to eliminate or reduce contaminant levels within the soil. Many problems associated with this method may limit its use and effectiveness. For example, dust generation that accompanies excavation exposes the surrounding environment and workers to the soil contamination. Also, many tons of soil may need to be excavated to effectively treat even a small contamination site. Equipment, labor, transport, and treatment costs may make the method prohibitively expensive compared to other soil remediation methods.

Biological treatment and in situ chemical treatment may also be used to remediate soil. Biological and/or chemical treatment may involve injecting material into the soil, such that the material reacts and/or moves contamination within the soil. A material injected during a biological or chemical treatment may be a reactant configured to react with the soil contamination to produce reaction products that are not contaminated. Some of the reaction products may be volatile. These reaction products may be removed from the soil.

The material injected during a chemical treatment may be a drive fluid configured to drive the contamination toward an extraction well that removes the contaminant from the soil. The drive fluid may be steam, carbon dioxide, or other fluid. Soil heterogeneity and other factors may, however, inhibit uniform reduction of contaminant levels in the soil using biological treatment and/or chemical treatment. Furthermore, fluid injection may result in migration of contaminants into adjacent soil.

Soil vapor extraction (SVE) is a process that may be used to remove contaminants from subsurface soil. During SVE, some vacuum is applied to draw air through the subsurface soil. Vacuum may be applied at a soil/air interface or through vacuum wells placed within the soil. The air may entrain and carry volatile contaminants toward the vacuum source. Off-gas removed from the soil by the vacuum may include contaminants that were within the soil. The off-gas may be transported to a treatment facility. The off-gas removed from the soil may be processed in the treatment facility to eliminate or reduce contaminants within the off-gas. SVE may allow contaminants to be removed from soil without the need to move or significantly disturb the soil. For example, SVE may be performed under roads, foundations, and other fixed structures.

Permeability of subsurface soil may limit the effectiveness of SVE. Air and vapor may flow through subsurface soil primarily through high permeability regions of the soil. The air and vapor may bypass low permeability regions of the soil, allowing relatively large amounts of contaminants to remain in the soil. Areas of high and low permeability may be characterized by, for example, moisture, stratified soil layers, and fractures and material heterogeneities within the soil.

Water may be present within soil. At a certain level within some soil, pore spaces within the soil become saturated with water. This level is referred to as the saturation zone. In the vadose zone, above the saturation zone, pore spaces within the soil are filled with water and gas. The interface between the vadose zone and the saturated zone is referred to as the water table. The depth of the water table refers to the depth of the saturated zone. The saturated zone may be limited by an aquitard. An aquitard is a low permeability layer of soil that inhibits migration of water.

Reduced air permeability due to water retention may inhibit contact of flowing air with contaminants in the soil during SVE soil remediation. Dewatering the soil may partially solve the problem of water retention. The soil may be dewatered by lowering the water table and/or by using a vacuum dewatering technique. These methods may not be effective methods of opening the pores of the soil to admit airflow. Capillary forces may inhibit removal of water from the soil when the water table is lowered. Lowering the water table may result in moist soil, which may limit air conductivity.

A vacuum dewatering technique may have practical limitations. The vacuum generated during a vacuum dewatering technique may diminish rapidly with distance from the dewatering wells. The use of vacuum dewatering may not significantly decrease water retention in the soil. This method may also result in the formation of preferential passageways for air conductivity located adjacent to the dewatering wells.

Many types of soil are characterized by horizontal layering with alternating layers of high and low permeability. A common example of a layered type of soil is lacustrine sediments, characterized by thin beds of alternating silty and sandy layers. Attempts to conduct SVE in such layers results in airflow that occurs substantially within the sandy layers and bypasses the silty layers.

Heterogeneities may be present in soil. Air and vapor may preferentially flow through certain regions or layers of heterogeneous soil, such as gravel beds. Air and vapor may be impeded from flowing through other regions or layers of heterogeneous soil, such as clay beds. Also, for example, air and vapor tend to flow preferentially through voids in poorly compacted fill material. Air and vapor may be impeded from flowing through overly compacted fill material. Buried debris within fill material may also impede the flow of air through soil.

Some components of soil contamination may be toxic. Such soil contamination may include mercury, mercury-containing compounds such as dimethyl mercury, radioactive materials such as plutonium, volatile hazardous compounds, and combinations thereof. Placement of wells or use of invasive testing procedures to identify the location and extent of the soil contamination may require special measures to ensure that the surrounding environment and workers are not exposed to contaminated vapor, dust, or other forms of contamination during installation and use of the wells or testing procedures. Such measures may include, but are not limited to, placing dust or vapor producing operations within enclosures to prevent release of contaminants to the environment, treating air within such enclosures to remove or reduce contamination before releasing the air to the environment, equipping workers with appropriate protective clothing, and/or equipping workers with appropriate breathing filters or separate source air supplies.

In some cases, removal of some contaminants from affected soil may be impractical, but removal of other contaminants may be desirable. For example, soil that is contaminated with radioactive material may also be contaminated with other contaminants such as mercury, mercury-containing compounds, hydrocarbons, and/or chlorinated hydrocarbons. Removal of the radioactive material may be impossible or impractical, but it may be desirable to remove or reduce other contaminants within the soil to inhibit such contamination from migrating to other areas through the soil.

The presence of water within the ground is often a problem for construction projects. The problem of water presence and/or water recharge may have to be overcome for some construction projects. A barrier to water migration into a selected area may be established by forming a freeze wall surrounding the selected area. The use of freeze walls to stabilize soil adjacent to a work site and to inhibit water migration into the work site has been implemented during construction of tunnels and shafts and during excavation work. In a typical application of freeze wells at a work site, freeze wells are inserted into the soil and a wall of frozen water and soil is formed around a selected area. The soil within the selected area is then excavated to form a hole. Supports may prevent the walls defining the hole from falling in. The freeze wall may be allowed to thaw when sufficient support is installed to prevent collapse of the walls. Alternatively, work within the hole formed by the removal of the soil may be completed relying on the frozen wall of water and soil to prevent the hole from collapsing. The frozen wall of water and soil may be allowed to thaw after completion of the work within the well.

U.S. Pat. No. 2,777,679 issued to Ljungström, which is incorporated by reference as if fully set forth herein, describes creating a frozen barrier to define a perimeter of a zone that is to be subjected to hydrocarbon production. Material within the zone is pyrolyzed by convectively advancing a heating front through the material to drive pyrolysis products toward production wells. U.S. Pat. No. 4,860,544, issued to Krieg et al., which is incorporated by reference as if fully set forth herein, describes establishing a closed cryogenic barrier confinement system about a predetermined volume extending downward from or beneath a surface region of Earth, i.e., a containment site.

Mercury contamination in soil presents a serious long-term hazard. Instances of widespread health problems resulting from mercury contamination have been documented in many countries around the world. Some mercury contamination is due to spills from industrial sources. For example, mercury spills from vessels that were used as electrodes in chloro/alkali plants are known sources of mercury contamination. Mercury contamination and mercury compound contamination may have occurred at mining and ore processing sites, battery manufacturing facilities, and may also be due to spills, leakage, and/or breakage of barometers, manometers, thermometers, mercury switches, and other mercury containing instruments and vessels. Unacceptable levels of mercury or mercury compounds may also be present in industrial and/or municipal sludge.

Elemental mercury may enter into soil if the pressure head of mercury exceeds the capillary entry pressure of the soil. The mercury may continue to move downward through the soil until the mercury encounters a low permeability layer in which small pore sizes result in high capillary pressures that prevent entry of the mercury. Mercury will typically pass into soil having a porosity greater than about 100 millidarcies. When the mercury reaches a barrier that it cannot pass into, the mercury may flow laterally along the barrier and pool in low places. A portion of a mercury spill that passes through soil may remain within pores of the soil. The amount of mercury retained within the pores of the soil may depend on pore shape and on mercury saturation. Typically, the pore space in a clean sandy soil will hold from 5% to 20% by volume of residual mercury per pore volume of the soil.

The physical properties of mercury may make mercury hard to remove from soil. The density of mercury (13.5 g/cc at 20° C.) may make it difficult to pump mercury out of soil. The retention of a portion of mercury within soil pore space may make it difficult to remove mercury from the soil so that the soil is no longer considered to be contaminated by mercury. The low vapor pressure of mercury (e.g., 0.0012 mmHg at 20° C. and 0.2729 mmHg at 100° C.) may make removal of mercury by a soil vapor extraction process at low or slightly elevated temperatures too time consuming to feasibly remediate mercury contaminated soil.

Mercury contaminated soil may be treated by soil excavation and subsequent treatment of the soil to remove the mercury. Excavated soil may be treated by leaching the mercury from the soil and/or by heating the soil to remove the mercury. Removal, treatment, and transportation of mercury containing soil may not be practical for large contaminated sites. Other types of soil contaminants, such as organic and/or radioactive contaminants, may be present in mercury contaminated soil. Safety considerations due to the presence of mercury and other types of contaminants may weigh against the use of excavation and subsequent treatment of mercury contaminated soil as a remediation method for treating the soil.

SUMMARY OF THE INVENTION

An in situ thermal desorption soil (ISTD) remediation system may be used to treat mercury contaminated soil. The soil remediation system may be used to eliminate or reduce to acceptable levels mercury, mercury compounds, and other removable contaminants within the mercury contaminated soil. The mercury may be located in an open location, or the mercury contamination may be located beneath a structure such as a concrete slab of a building. If the contamination is located beneath a structure, the structure may be moved, removed, or altered so that the heaters and extraction wells of the soil remediation system contact the contaminated soil beneath the structure.

Location, extent, and concentration of mercury contamination may be determined prior to installing a soil remediation system that will remove or reduce to acceptable levels contaminants within the soil. Non-intrusive tests may be used to establish the location of mercury within the soil. The use of radar, gravimetric surveys, and/or electromagnetic surveys may determine the presence of mercury within the soil. The metallic characteristics of mercury may make large quantities of mercury within the soil detectable using radar. The presence of water within the soil may limit the effectiveness of radar as a mercury locating test. The presence of mercury within soil may increase the average density of the soil. A measurable increase in gravity may be indicated above soil that is contaminated with mercury. A gravity survey may be used to detect density anomalies in the soil. A detected anomaly may indicate the presence of mercury, or the detected anomaly may indicate the presence of some other type of density anomaly in the soil. In addition to increasing the average density of the soil, mercury may decrease the electrical resistance of the soil and cause induced polarization. Radar indications, density anomalies, decrease in soil resistance, and/or the presence of induced polarization may indicate the presence of mercury contamination within an area of soil.

Non-intrusive testing, or substantially non-intrusive testing, such as radar, gravimetric survey, or an electromagnetic survey may indicate the presence of mercury within a region of soil. Such tests may indicate an area of mercury contamination, but the tests may not give accurate concentration and depth information of the contamination. After mercury contamination is found within the soil, the extent, depth, and concentration of the mercury contamination may be determined by intrusive tests. Test wells may be placed within the soil. Testing of cores from the test wells and testing of fluid removed from soil through test wells may be used to determine depth and concentration information of soil contamination. A logging tool or tools may also be used to determine the mercury concentration in situ. Logging tools may be important in determining the location, extent, and concentration of mercury contamination prior to remediating the soil. Logging tools may also be important in evaluating the progress and effectiveness of a soil remediation process during the soil remediation. In an embodiment of a soil remediation system, a neutron logging tool may be used to provide in situ measurements of mercury concentration.

A soil remediation system used to treat mercury contaminated soil may be an ISTD soil remediation system. Heat may be applied to the soil by thermal blankets and/or heater wells. The type of soil heater may be determined based on the depth of the contaminants within the soil. Heater blankets may be used when contamination is close to the ground surface. Heater wells may be used when the contamination is deeper in the soil. The heat applied to the soil may raise the soil temperature above the boiling point of mercury throughout a treatment area. A ring or rings of heater-extraction wells may surround other remediation wells in a treatment area. The heater-extraction wells may inhibit migration of contamination from the treatment area during soil remediation.

Containment of mercury within the treatment area and reduction of airflow throughout the treatment area may be enhanced by a ground cover and by a barrier around a periphery of the treatment area. The barrier may inhibit migration of soil contamination into adjacent areas. The barrier may also inhibit fluid flow into the treatment area from adjacent areas. The barrier may be formed of sections of steel plate or other type of material that are driven into the soil around the periphery of the treatment area. Grouting, high temperature rubber seals, or other types of seals may be used to couple individual sections together. Alternatively, the barrier may be a frozen barrier formed by freeze wells placed around the periphery of the treatment area.

A ground cover for a soil remediation system may inhibit release of vapor into the air from a treatment area. The ground cover may also inhibit fluid from being drawn into the soil from the ground surface. In an embodiment, the ground cover may include a first steel sheet placed on the surface of the ground, a layer of insulation on top of the first steel sheet, and a vapor barrier over the insulation. Portions of wells extending into the soil may pass through the first steel sheet. The wells may be welded or otherwise sealed to the barrier. The vapor barrier may inhibit release of material that escapes past the first steel sheet and may also inhibit air and/or water from being drawn into the soil from the surface. The vapor barrier may be a steel barrier and/or a polymer barrier. The polymer barrier may be, but is not limited to, polyethylene, polypropylene, silicone rubber, or combinations thereof. The vapor barrier may be sloped to direct runoff rainwater to a desired location. Condensate formed on an interior side of the vapor barrier may be gathered and introduced into a treatment system of the soil remediation system to ensure that any contaminants within the condensate are properly treated. A support structure may be placed on top of the first steel sheet. The support structure may support wells, risers, wiring, collection piping and other structures that pass into or out of the ground within the treatment area.

A soil remediation system may include a perimeter barrier that surrounds or partially surrounds a treatment area. The perimeter barrier may be a freeze wall, a grout wall, and/or a number of sheets inserted into the ground to a desired depth and sealed together. A seal may be formed between a portion of a ground cover and the perimeter barrier. The seal may be, but is not limited to, a weld; adhesive; and/or gaskets and clamping force provided by clamps, screws, bolts, or other types of fasteners. The perimeter barrier may inhibit migration of contaminants out of the treatment area. The perimeter barrier may also inhibit entry of fluid into the treatment area from areas adjacent to the treatment area.

Off-gas removed from the treated soil may be maintained in a vapor state within heated risers in the wells. Downstream from the riser, the mercury may condense and flow downward through a surface conduit to a treatment facility. Alternatively, the surface conduits may be heated to maintain contaminants in a vapor state in route to the treatment facility. In embodiments where the conduit is not heater, the conduit may be gas (e.g., air) or liquid cooled. The treatment facility may include a separator to remove liquid mercury and other condensed liquids. The remaining vapor may be passed through a treatment facility. The treatment facility may include condensers, carbon beds, carbon sulfur beds, thermal oxidizers, and heat exchangers.

BRIEF DESCRIPTION OF THE DRAWINGS

Advantages of the invention will become apparent upon reading the following detailed description and upon reference to the accompanying drawings in which.

Figure 1:
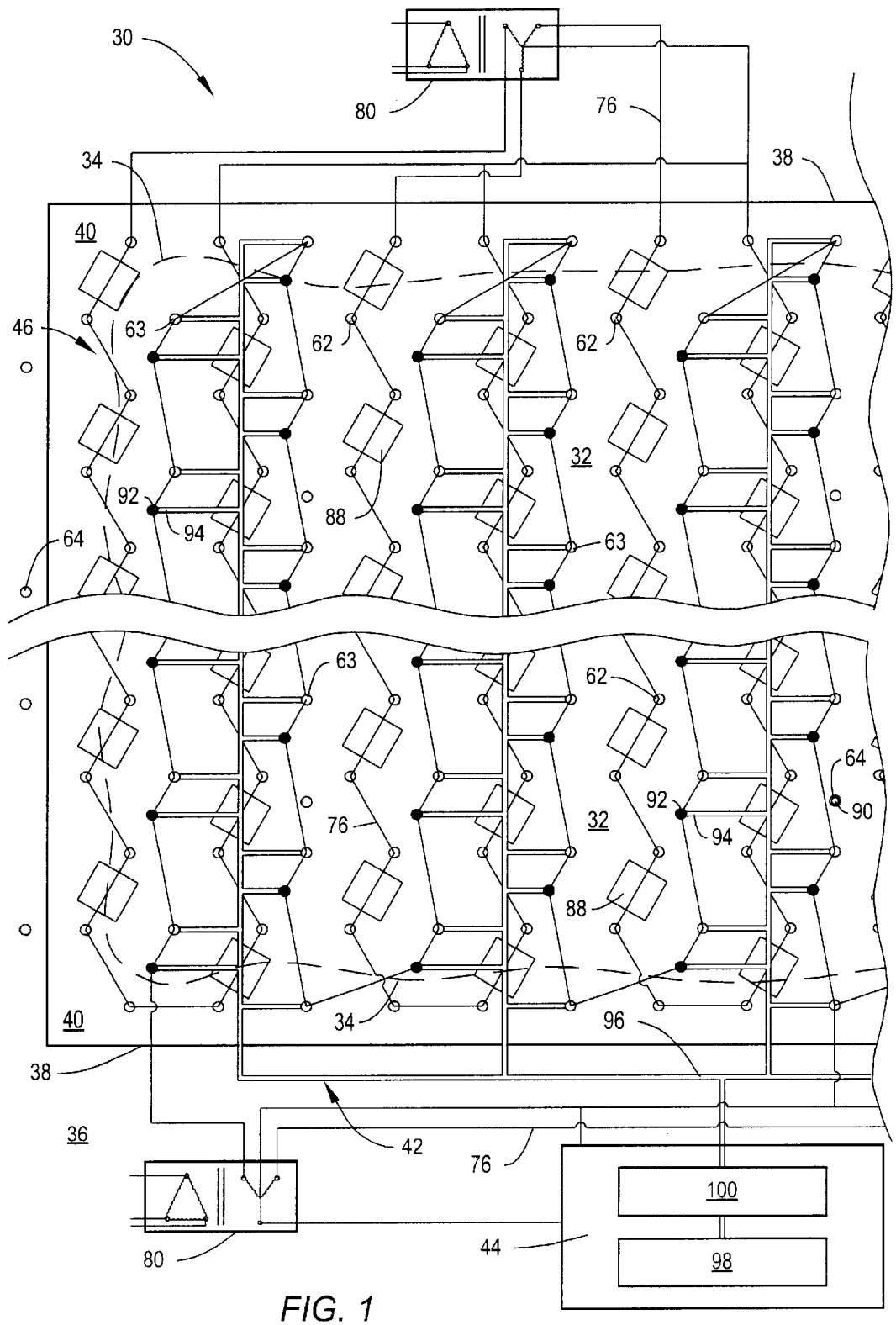
FIG. 1 depicts a schematic representation of an embodiment of an in situ thermal desorption (ISTD) soil remediation system.

While the invention is susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF PREFERRED EMBODIMENTS

An in situ thermal desorption (ISTD) process system may be used to remediate contaminated soil. An ISTD soil remediation process involves in situ heating of the soil to raise the temperature of the soil while simultaneously removing off-gas by vacuum. Heating the soil may result in removal of contaminants by a number of mechanisms. Such mechanisms may include, but are not limited to: vaporization and vapor transport of the contaminants from the soil; evaporation or entrainment and removal of contaminants in an air or water vapor stream; and/or thermal degradation or conversion of contaminants into non-contaminant compounds by pyrolysis, oxidation, or other chemical reactions within the soil (e.g., contaminants other than mercury such as hydrocarbon and/or chlorinated hydrocarbon contaminants).

An ISTD soil remediation process may offer significant advantages over soil vapor extraction (SVE) processes and processes that depend on the injection of drive fluids, chemical reactants, and/or biological reactants into the soil. Fluid flow conductivity of an average soil may vary by a factor of $10^8$ throughout the soil due to differences in soil type (gravel, sand, clay) or to soil heterogeneities and water within the soil. As used herein, "fluid" refers to matter that is in a liquid or gaseous state. Mass transport of fluid through the soil may be a limiting factor in the remediation of a treatment site using an SVE process or a chemical and/or biological treatment of the soil. In contrast to the extremely large variation in fluid flow permeability of soil, thermal conductivity of an average soil may vary by a factor of only about two throughout the soil. Injecting heat into soil may be significantly more effective than injecting a fluid through the same soil. Furthermore, injecting heat into soil may also result in a preferential increase in the permeability of the tight (low permeability) soil. Injected heat may dry the soil. As the soil dries, microscopic and macroscopic permeability of the soil may increase. The increase in permeability of heated soil may allow an ISTD soil remediation process to remove or more uniformly reduce contaminants to acceptable levels throughout a treatment area. The increase in soil permeability may allow in situ remediation of low permeability clays and silts that are not amenable to standard soil vapor extraction processes.

In a soil remediation embodiment, a method of decontamination includes heating the contaminated soil to temperatures at which the contaminants are removed by vaporization and/or thermal destruction. In situ water may vaporize and evaporate or steam distill contaminants, allowing removal from the soil through extraction wells.

Soil may be heated by a variety of methods. Methods for heating soil include, but are not limited to, heating by thermal radiation or conduction from a heat source, heating by radio frequency heating, or heating by electrical soil resistivity heating. "Radiative heating" refers to radiative heat transfer from a hot source to a colder surface. "Conductive heating" refers to heat transfer by physical contact of a media. Heat is transferred from a high temperature heater in a well to the soil surface substantially by radiation. Heat is transferred primarily by conduction from the heated soil surface to adjacent soil, thereby raising the soil temperature at some distance from the heat source. Radiative and/or conductive heating may be advantageous because temperatures obtainable by such heating are not limited by the amount of water present in the soil. Soil temperatures substantially above the boiling point of water may be obtained using thermal radiative and/or conductive heating. Soil temperatures of about 100° C., 125° C., 150° C., 200° C., 400° C., 500° C. or greater may be obtained using thermal radiative and/or conductive heating. The heat source for radiative and/or conductive heating may be, but is not limited to, an electrical resistance heater placed in a wellbore, a heat transfer fluid circulated through a wellbore, or combustion within a wellbore.

Heaters may be placed in or on the soil to heat the soil. For soil contamination within about 1 m of the soil surface, thermal blankets and/or ground heaters that are placed on top of the soil may apply conductive heat to the soil. A vacuum system may draw a vacuum on the soil through vacuum ports that pass through the thermal blanket. The heaters may operate at about 870° C. U.S. Pat. No. 5,221,827 issued to Marsden et al., which is incorporated by reference as if fully set forth herein, describes a thermal blanket soil remediation system. U.S. Pat. No. 4,984,594 issued to Vinegar et al., which is incorporated by reference as if fully set forth herein, describes an in-situ method for removing contaminants from surface and near-surface soil by imposing a vacuum on the soil beneath a impermeable flexible sheet and then heating the soil with an electric surface heater that is positioned on the soil surface under the sheet.

For deeper contamination, heater wells may be used to supply heat to the soil. U.S. Pat. No. 5,318,116 to Vinegar et al; U.S. patent application Ser. No. 09/549,902 to Vinegar et al.; and U.S. Pat. No. 6,632,047 to Vinegar et al., each of which is incorporated by reference as if fully set forth herein, describe ISTD soil remediation processes for treating contaminated subsurface soil with thermal radiative or conductive heating. U.S. Pat. No. 6,688,387 to Wellington et al.; U.S. Patent Publication No. 20030136558 of Wellington et al.; and U.S. Patent Publication No. 20030192691 of Wellington et al. also describe heaters and various equipment. Each of these applications is incorporated by reference as if fully set forth herein.

Some heater wells may include perforated casings that allow fluid to be removed from the soil. A heater well with a perforated casing may also allow fluid to be drawn or injected into the soil. Vacuum may be applied to the soil to draw fluid from the soil. The vacuum may be applied at the surface or through extraction wells placed within the soil.

The term "wells" refers to heater wells, extraction wells, injection wells, and test wells. Soil temperature may be raised using heater wells. Fluid from the soil may be withdrawn from the soil through extraction wells. Some extraction wells may include heater elements. Such extraction wells, which are referred to as "heater-extraction wells," are capable of both raising soil temperature and removing fluid from the soil. In a region adjacent to a heater-extraction well, heat flow may be counter-current to fluid flow. Fluid withdrawn from the heater-extraction well may be exposed to a high enough temperature within the heater-extraction well to result in the destruction of some of the contaminants within the fluid. Injection wells allow a fluid to be inserted into the soil. Sampling or logging of the soil or fluid from the soil may be performed using test wells that are positioned at desired locations within a well pattern of a soil remediation system.

An in situ soil remediation system may include a plurality of heater wells and at least one vapor extraction well. A vapor extraction well may also include one or more heater elements. Heater-vapor extraction well heater elements may provide heat for establishing an initial permeability in the vicinity of the vapor extraction well. The additional heat may also prevent condensation of water vapor and contaminants in the well. In some extraction well embodiments, the extraction wells may not include heater elements. Absence of heater elements within the vapor extraction well may simplify the design of the vapor extraction wellbore, and may be preferred in some applications.

Wells may be arranged in a pattern of rows and columns within the soil. Rows of wells may be staggered so that the wells are in a triangular pattern. Alternatively, the wells may be aligned in a rectangular pattern, pentagonal pattern, hexagonal pattern, or higher order polygonal pattern. A distance between adjacent wells may be a substantially fixed distance so that a polygonal well pattern may be made up of regular arrays of triangles or squares. A spacing distance between adjacent wells of a pattern may range from about 1 m to about 12 m or more. A typical spacing distance may be from about 2 m to 4 m. Some wells may be placed out of a regular pattern to avoid obstructions within the pattern.

An ISTD soil remediation process may have several advantages over an SVE system. Heat added to the contaminated soil may raise the temperature of the soil above the vaporization temperatures of contaminants within the soil. If the soil temperature exceeds the vaporization temperature of a soil contaminant, the contaminant may vaporize. Vacuum applied to the soil may be able to draw the vaporized contaminant out of the soil. Even heating the soil to a temperature below vaporization temperatures of the contaminants may have beneficial effects. Increasing the soil temperature may increase vapor pressures of the contaminants in the soil and allow an air or water vapor stream to remove a greater portion of the contaminants from the soil than is possible at lower soil temperatures. Increased permeability of the soil due to heating may allow removal of contaminants throughout a soil treatment area.

U.S. Patent Publication Nos. 20040126190 of Stegemeier et al. 20040120772 Vinegar et al. and 20030110794 of Stegemeier et al. describe ISTD soil remediation processes. Each of these references is incorporated by reference as if fully set forth herein.

Many soil formations include a large amount of water as compared to contaminants. Raising the temperature of the soil to the vaporization temperature of water may vaporize the water. The water vapor may help volatize (by steam distillation) and/or entrain contaminants within the soil. Vacuum applied to the soil may remove the volatized and/or entrained contaminants from the soil. Vaporization and entrainment of contaminants may result in the removal of medium and high boiling point contaminants from the soil.

In addition to allowing greater removal of contaminants from the soil, the increased heat of the soil may result in the destruction of contaminants in situ (e.g., contaminants other than mercury such as hydrocarbon and/or chlorinated hydrocarbon contaminants). The presence of an oxidizer, such as air or water vapor, may result in the oxidation of contaminants that pass through high temperature soil. In the absence of oxidizers, contaminants within the soil may be altered by pyrolysis. Vacuum applied to the soil may remove reaction products from the soil.

A heating and vapor extraction system may include heater wells, extraction wells, heater-extraction wells, injection wells, and/or test wells. Heater wells apply thermal energy to the soil to increase soil temperature. Extraction wells of a heating and vapor extraction system may include perforated casings that allow off-gas to be removed from the soil. The casing or a portion of the casing may be made of a metal that is resistant to chemical and/or thermal degradation. Perforations in a well casing may be plugged with a removable material prior to insertion of the casing into the ground. After insertion of the casing into the ground, the plugs in the perforations may be removed. U.S. Pat. No. 6,543,539, which is incorporated by reference as if fully set forth herein, describes wells that are installed with removable plugs placed within perforations of the well casings. Perforations in a well casing may be, but are not limited to, holes and/or slots. The perforations may be screened. The casing may have several perforated zones at different positions along a length of the casing. When the casing is inserted into the soil, the perforated zones may be located adjacent to contaminated layers of soil. The areas adjacent to perforated sections of a casing may be packed with gravel or sand. The casing may be sealed to the soil adjacent to non-producing soil layers to inhibit migration of contaminants into uncontaminated soil.

A barrier may be formed around soil to be remediated. The barrier may include natural perimeter barriers and/or installed perimeter barriers. Natural perimeter barriers may be soil layers that are substantially impermeable to fluid flow, such as overburdens and/or underburdens. Installed perimeter barriers may be barriers formed in the ground. Installed barriers include, but are not limited to, interconnected sheets in the ground, grout walls, and frozen barriers formed by freeze wells.

Freeze wells may be used in conjunction with or in lieu of other types of barriers to inhibit migration of contamination from a treatment area. In addition to inhibiting migration of contaminants from the treatment area, a frozen barrier formed by freeze wells may inhibit migration of water into the treatment area. The freeze wells may inhibit a temperature increase or a sterilization of soil adjacent to the treatment area. The freeze wells may also limit the amount of air drawn from adjacent soil into the treatment area.

Elemental mercury may contaminate subterranean soil. Mercury compounds, organic compounds, and other types of contamination may also be present within mercury contaminated soil. The contamination may be located within an open area, or the contamination may be located under a structure such as a concrete building slab. Locating and determining the extent of mercury contamination may be a first step in a process of remediating mercury contaminated soil. Several properties of mercury may facilitate locating and defining the extents of mercury contamination. Initial location of mercury contamination may be performed using geophysical techniques that are either non-intrusive or require only minimal intrusion into the soil. Initial location of mercury contamination within a region of soil may be performed using radar, gravity surveys, and/or electromagnetic surveys.

A large quantity of elemental mercury within soil may provide a large radar signature. The use of radar to find mercury contamination within soil may be limited by the presence of water in the soil and/or by the presence of metallic structures within the soil. Metallic structures may include, but are not limited to, metal sheets, metallic tanks, and rebar networks.

Gravitational pull may be increased above a high mercury concentration within soil because of increased soil density. The gravitational attraction of a slab of thickness t, with a density difference relative to background of D may be expressed as:

$$G=0.0127D\ t\ (milligal)$$

For D=1 gm/cm$^3$ and for a 4 foot thickness of soil, the gravitational pull will be about 0.05 milligal. Such a density difference corresponds to a 20% mercury saturation of a 35% porosity soil. Such a gravitational pull may be detected by a Model D gravimeter available from LaCoste & Romberg (Austin, Tex.). The gravimeter has a precision of approximately 0.005 milligal.

A gravity survey may result in the generation of a gravity contour map. The gravity contour map may emphasize an areal distribution of density anomalies within a region. A density anomaly may not be the result of mercury contamination within soil. Also, a gravity survey may provide no indication of depth of contamination within the soil.

An electromagnetic survey may be used to detect mercury contamination within soil. An electromagnetic survey may be used in conjunction with a gravity survey and/or a radar survey to confirm the presence of mercury and provide an indication of contamination depth. An electromagnetic survey may include a resistivity survey and an induced polarization (IP) survey. In general, soil containing a significant amount of mercury will be less resistive and have a greater IP response than soil without mercury.

Electrodes may be driven into the soil to a depth of about 0.3 m. The electrodes may be connected to a current source, and resulting voltages may be measured during a resistivity survey. The resistivity survey may use a 4-electrode Wenner array (I-V-V-I). The spacing between electrodes may be increased to probe deeper into the soil. Information may be obtained to a depth equal to approximately the electrode spacing. An initial spacing of about 1.2 m to about 1.5 m may be used. Repeat measurements with multiples of the initial spacing may be used to provide additional depth information. The same Wenner array may be used for an IP survey. Induced polarization occurs when current is forced across a brine/metal interface and an electrical conduction mechanism changes from ionic to electronic conduction. Both metals and clays have IP responses, but a metallic IP response is both larger in magnitude and non-linear with current density because of reactions driven at the brine/metal interface.

An electromagnetic survey may complement a gravity survey by providing depth information. An electromagnetic survey may also provide information on the presence of lower concentrations of mercury than will a gravity survey. After an area of mercury contamination has been defined, intrusive tests may be performed in areas of low and high concentration to obtain detailed information on the soil, soil contaminants, and concentrations of the soil contaminants. The intrusive tests may include, but are not limited to, obtaining and analyzing core samples, obtaining and analyzing fluid from the soil, and performing neutron logging.

An uncontaminated soil core sample or samples may be taken from the soil to evaluate the physical properties of the soil. The sample or samples may be used to determine porosity, horizontal permeability, vertical permeability, mercury capillary pressure, and residual mercury saturation of soil layers within the soil. Contaminated soil cores may be used to determine contamination concentration at specific locations within and surrounding a treatment area. A contaminated soil core or cores may be taken for laboratory evaluation that simulates a proposed soil remediation process, and/or for comparison to core samples taken after completion of soil remediation.

Neutron logging may be performed to obtain accurate in situ measurement of mercury concentration within soil. Neutron logging may be used to determine mercury concentrations before, during, and/or after a soil remediation procedure. There are at least two independent methods of measuring mercury concentrations using pulsed neutron logging tools: 1) measurement of the neutron cross section, and 2) measurement of the characteristic capture spectra. Mercury has an extraordinarily high thermal neutron capture cross section (sigma). The sigma may be many times greater than that of naturally occurring earth materials. The mercury sigma is calculated to be greater than 15,000 capture units (cu). By comparison, a typical sandstone has a sigma of 10 cu and fresh water has a sigma of 22 cu. A water saturated sandstone (the sandstone having a porosity of about 30%) may have a sigma of about 13.6 cu. The introduction of a 5% residual mercury saturation would elevate the sigma of the sandstone to about 265 cu. A neutron logging tool with a sigma precision of ±1 cu may be able to monitor changes in mercury concentration of ±22 parts per million (ppm).

Mercury has a high sensitivity capture spectral peak that can be identified and quantified with a statistical uncertainty of about ±120 ppm. Mercury spectrally correlates with both sulfur and potassium. If the soil being tested has little or no sulfur or potassium, the uncertainty may be reduced to about ±70 ppm.

A neutron logging tool may be used to perform both thermal neutron and capture spectra measurements to determine mercury concentration. A probe of the neutron logging tool may be may be suspended within either a cased or open borehole. The probe may advantageously be placed within a steel cased borehole without significantly affecting accuracy of the neutron logging tool. The steel cased borehole may inhibit exposure of contaminants to workers and the atmosphere before and during soil remediation. The casing and/or probe may be placed within an augered hole, or the casing and/or probe may be inserted into the ground with insertion equipment, such as a Geoprobe truck with a cone penetrometer. The probe of the neutron logging tool may be lowered or raised to a desired depth within the soil. After taking measurements at several different depths within the soil, the probe may be removed from the soil, and the neutron logging tool may be moved and used to take measurements at a different location. The neutron logging tool may be used within a selected well or selected wells during a soil remediation process to monitor progress of the soil remediation. Wellbores in the ground that are used during determination of extent, depth, and concentration of mercury contamination within contaminated soil may be used during soil remediation as wellbores for extraction wells, heater wells, injection wells, or test wells.

A Schlumberger RST (Reservoir Saturation Tool) and a Schlumberger APS (Accelerator Porosity Sonde) may be used as the neutron logging tools for measuring mercury concentration within soil. Both tools measure both sigma and capture spectra. The RST has a 4.3 cm outer diameter. The RST has a vertical resolution of about 0.3 m and a depth of investigation of about 22 cm. Measurements may be taken to within about 1 m of the borehole depth. The APS has a 9.2 cm outer diameter.

The use of neutron logging may offer several advantages for locating mercury and for evaluating remediation efficiency. Some of the advantages may include: minimizing the need to take, keep, and analyze core samples; providing the ability to measure very low mercury concentrations; providing the ability to take measurements before, during, and after soil remediation at various depths in the soil; and providing the ability to average large sample volumes to reduce statistical variations. The logging tool may be placed in a cased well to minimize or eliminate worker exposure to contaminants within the soil being treated. Alternatively, a logging tool may be placed into a perforated casing or into a wellbore without a casing.

After determining an area of soil contamination, numerical simulations may be utilized to model a soil remediation system for removing or reducing the contamination. A general purpose simulator, such as the Steam, Thermal and Advanced Processes Reservoir Simulator (STARS) available from Computer Modeling Group, Ltd. (Alberta, Canada), may be used for numerical simulation work. Also, a simulator for freeze wells, such as TEMP W available from Geoslope (Calgary Alberta), may be used for numerical simulations that model freeze wells, if such wells are to be utilized to form a barrier.

A soil remediation system may be installed to remediate the contaminated soil. In some embodiments of soil remediation systems, the contaminated soil may be entirely enclosed within a well pattern of the soil remediation system. If the contamination is located below a structure, the structure may be moved, removed, or altered to allow installation of the soil remediation system. For example, if mercury contamination is located below a concrete slab, the concrete slab may be removed before installation of wells of a soil remediation system. Alternatively, holes may be drilled or punched through the slab at locations where wells will be positioned in the soil.

FIG. 1 depicts an embodiment of in situ thermal desorption system 30 that may be used to treat mercury contaminated soil 32 enclosed within a perimeter indicated by dashed line 34. Non-contaminated soil 36 may be adjacent to contaminated soil 32. Soil remediation system 30 may include barrier 38, ground cover 40, a plurality of wells, vapor collection system 42, treatment facility 44, and a control system. Barrier 38 may define a perimeter of treatment area 46.

Barrier 38 for mercury soil remediation system 30 may be, but is not limited to, a plurality of sheets inserted into the ground, a grout wall, a freeze wall, or combinations thereof. Barrier 38 should be resistant to breaching due to high temperatures and chemicals within the soil. In an embodiment, sheets inserted into the ground are steel sheets that are impacted into the ground at a perimeter of a treatment area. In an alternative embodiment, sheets inserted into the ground are interconnected sheets placed in trenches along a perimeter of a treatment area. The trenches may be back-filled with soil or fill material such as sand or gravel. Sheets that form a barrier may be interconnected at ends of the sheets by high temperature sealant, high temperature grout, welds, or other types of connections. A grout wall may be formed by pouring grout within a trench along the perimeter of the treatment area. A plurality of freeze wells 48 (a freeze well shown in FIG. 2) may be used to form a frozen barrier around a perimeter of a treatment area. Freeze wells 48 may be wells that cool the soil to temperatures below the freezing point of water within the soil. A frozen barrier that is impermeable to fluid flow may form between adjacent freeze wells 48.

Barrier 38 may inhibit inflow of fluid (gases and liquids) into treatment area 46. Barrier 38 may also inhibit undesired outflow of fluid from the treatment area. In an embodiment, barrier 38 may extend into the soil to a depth below the depth of soil contamination. Some ISTD soil remediation systems may not include a barrier. Other soil remediation systems may only include a barrier around a portion of the perimeter of the treatment area.

Figure 2:
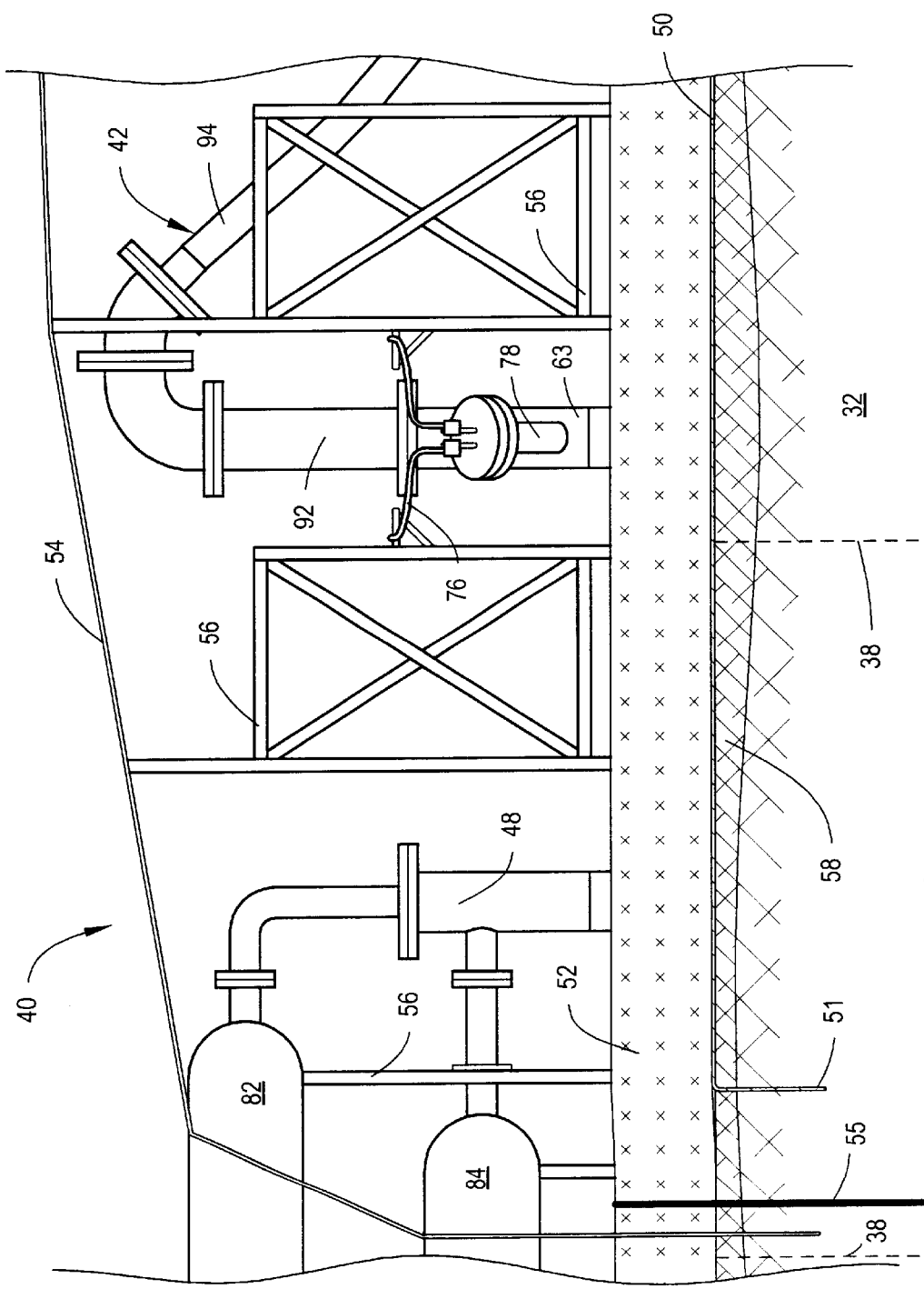
FIG. 2 depicts a cross-sectional view of a portion of a soil remediation system.

FIG. 2 shows a portion of ground cover 40 adjacent to a well. Ground cover 40 may be placed over a treatment area. Ground cover 40 may extend up to or beyond a perimeter of the treatment area. Ground cover 40 may inhibit vapor from escaping from the treatment area to the atmosphere. Ground cover 40 may also inhibit fluid (liquid and vapor) from being drawn into the treatment area through the ground surface. A portion of ground cover 40 may be sealed to peripheral barrier 55 around a perimeter of a treatment area. Ground cover 40 may include metal sheet layer 50, insulation 52, impermeable layer 54, and framework 56. Metal sheet layer 50 may be placed on top of fill material 58, such as sand or gravel, that is used to level the ground of a treatment area. All wells and structures that penetrate metal sheet layer 50 may be welded or otherwise sealed to the metal sheet layer so that the metal sheet layer inhibits fluid flow into or out of the soil except through the wells or structures.

Metal sheet layer 50 may be formed from a number of separate sections that are welded, sealed with high temperature sealant, or otherwise coupled together to form a layer that inhibits fluid escape from the treatment area and fluid entry into the treatment area. Metal sheet layer 50 may be sealed by welds, high temperature sealant, or other sealant to peripheral barrier 55 surrounding the treatment area and to wells within the treatment area. In an embodiment, peripheral barrier 55 may be a sheet pile driven down to an aquitard, and metal sheet layer 50 is sealed to the sheet pile. If freeze wall 38 is used as a barrier, a lip 51 of the metal sheet layer may be frozen to the barrier during formation of the freeze wall. Sealing a barrier to the metal sheet layer may inhibit fluid from being drawn into the treatment area from areas adjacent to the treatment area. Inhibiting fluid inflow may allow a vacuum system of a treatment system to draw a high vacuum on the soil within the treatment area during remediation. The high vacuum may result in a large amount of mercury and other soil contamination being removed from the contaminated soil during soil remediation.

Metal sheet layer 50 and other components of a soil remediation system that may be exposed to high temperatures, mercury, and/or other contaminants may be made of materials that are resistant to amalgamation and are resistant to chemical and/or thermal degradation. In an embodiment, the metal sheet layer is carbon steel.

Ground cover 40 may include insulation 52 that is placed on top of or below metal sheet layer 50. Placing insulation 52 above metal sheet layer 50 may advantageously inhibit contamination of the insulation. Insulation 52 may inhibit heat loss to the atmosphere during soil remediation. The insulation may be any type of high temperature insulation. The insulation may be, but is not limited to, mineral insulation, glass fiber insulation, or vermiculite insulation. In an embodiment, the insulation is vermiculite insulation that is blown around framework 56.

Ground cover 40 of soil remediation system 30 may include impermeable layer 54. Impermeable layer 54 may be a back-up layer for metal sheet layer 50 to inhibit vapor release to the atmosphere. Impermeable layer 54 may be sealed to barrier 38, barrier 55, and/or to metal sheet layer 50. Impermeable layer 54 may also serve as a water barrier to inhibit rainwater or other fluid from coming into contact with insulation 52, metal sheet layer 50, and/or portions of wells and heaters placed in a treatment area. Impermeable layer 54 may be, but is not limited to, metal, canvas, polymer, or combinations thereof. Impermeable layer 54 may be sloped to inhibit pooling of water on top of the impermeable layer. Condensate that forms on an inner surface of impermeable layer 54 may be directed to condensate traps. If a condensate trap collects a significant amount of condensate, the condensate may be tested for contamination. If the condensate contains contaminants, the condensate may be introduced into a treatment facility of the soil remediation system or transported to an off-site treatment facility.

In a soil remediation system embodiment, a treatment facility or a separate vacuum system may draw a slight vacuum between metal sheet layer 50 and impermeable layer 54. The vacuum drawn between metal sheet layer 50 and impermeable layer 54 does not need to be a large vacuum. If the vacuum is drawn by a separate vacuum system, discharge from the vacuum may be connected to treatment system 44.

Framework 56 may be part of ground cover 40. Framework 56 may inhibit compression and/or disruption of insulation 52 placed on metal sheet layer 50. Framework 56 may support wells and other structures, such as risers, placed within the treatment area. Framework 56 may support a walkway that provides access to heater wells, extraction wells, test wells, and ground heaters within a treatment area. Impermeable layer 54 may be supported on portions of framework 56.

A ground cover may not be necessary in some soil remediation system embodiments. A ground cover may not be required if the contaminated soil is so deep and/or there are intervening impermeable layers between the surface and the contamination such that heating the soil and removing off-gas from the soil will have negligible effect at the soil surface.

As shown in FIG. 1, a plurality of wells may be placed within treatment area 46. Wells for a soil remediation system may be extraction wells 60, heater wells 62, combination heater-extraction wells 63, injection wells, freeze wells, and/or test wells 64. Wells may be inserted into the soil in a number of different ways. Openings may be drilled into the soil, and wells may be placed into the soil. Wells may be driven and/or vibrated into the soil. Driving and/or vibrating wells into soil may have several advantages. Driving and/or vibrating wells into soil may not result in the formation of cuttings as does drilling an opening in the soil. Cuttings formed during drilling may be considered hazardous material if the soil contains hazardous material. The cuttings may require special handling and disposal procedures. Driving and/or vibrating wells into soil may result in less dust and vapor generation as compared to drilling openings for wells. Less dust and vapor generation may minimize equipment and expense associated with preventing dust and vapor exposure to workers during well installation into contaminated soil.

Some freeze well embodiments and soil remediation well embodiments may include well casings. Well casings may be formed from standard piping that is threaded or welded together and positioned in a wellbore using a drilling rig. Well casings typically range from about 5 cm to about 15 cm in diameter. Larger or smaller well casings may be used to meet specific site requirements.

In an embodiment, well casings may be installed by coiled tubing installation. Coiled tubing installation may reduce a number of welded and/or threaded connections in a length of casing. Welds and/or threaded connections in coiled tubing may be pre-tested for integrity. Coiled tubing is available from Quality Tubing, Inc. (Houston, Tex.) and other manufacturers. Coiled tubing may be available in many sizes and different materials. Sizes of coiled tubing may range from about 2.5 cm to about 15 cm. Coiled tubing may be available in a variety of different metals, including carbon steel. Coiled tubing may be spooled on a large diameter reel. The reel may be carried on a coiled tubing unit. Suitable coiled tubing units are available from Fleet Cementers, Inc. (Cisco, Tex.) and Halliburton Co. (Duncan, Okla.). An endcap may be threaded and/or welded on the coiled tubing if the casing is to be a sealed casing. Coiled tubing is unwound from the reel, passes through a straightener, and is inserted in a wellbore. After insertion, the coiled tubing may be cut from the coiled tubing on the reel.

Some well embodiments include elements (such as inlet conduits) positioned within casings. The elements may be positioned within the casing before the casing is wound on the reel. If the coiled tubing includes elements positioned within a casing, a single installation procedure may be used to place the well into the soil. Alternatively, casings may be installed using coiled tubing installation, and the elements may be subsequently installed in the casings using coiled tubing installation or a different insertion procedure. In some embodiments, casings may be inserted using methods other than coiled tubing installation, and elements positioned in the casing may be installed using coiled tubing installation.

Diameters of certain well casings, such as freeze well casings, installed in the ground may be oversized as compared to a minimum diameter needed to allow for formation of a low temperature zone. For example, if design calculations indicate that 10.2 cm piping is needed to provide sufficient heat transfer area between the soil and the freeze wells, 15.2 cm piping may be placed in the soil. The oversized casing may allow a sleeve or other type of seal to be placed into the casing should a leak develop in the freeze well casing.

Some ISTD soil remediation system embodiments may not include wells. Heaters for such systems may be placed on top of the soil and may be covered with an impermeable and insulating ground cover. Alternatively, heaters may be placed on top of a metal sheet of a ground cover. A treatment system may draw a vacuum beneath the ground cover to remove off-gas from the soil. In other ISTD soil remediation system embodiments, heaters may be placed in trenches within a treatment area and the heaters may be covered with soil and/or fill material. A treatment system may draw a vacuum below a ground cover to remove off-gas that is mobilized by the heaters.

Wells may be placed substantially vertically within the soil or directionally positioned within the soil at any desired angle. A well may be substantially parallel to an adjacent well. In an embodiment, wells are placed within trenches formed in the soil. After the wells are placed in the trenches, the trenches may be filled with soil or fill material. In other soil remediation system embodiments, wells may be vertically inserted and/or directionally inserted into the soil.

Extraction wells 60 may be attached by vapor collection system 42 to treatment facility 44. As shown in FIG. 1, a vacuum produced by treatment facility 44 may draw off-gas out of extraction wells 60. Extraction wells may be placed in a regular pattern within a treatment area to promote uniform off-gas removal throughout the treatment area. In some soil remediation system embodiments, some extraction wells may be placed in irregular locations to avoid obstructions within the treatment area. The extraction wells may be placed in triangular, rectangular, pentagonal, hexagonal, or higher order polygon patterns. A spacing between extraction wells may be determined by specific site parameters. A spacing between extraction wells may range from about 0.61 m to 9.1 m or more. In the soil remediation system embodiment depicted in FIG. 1, extraction wells 60 are placed in a triangular pattern at centers of six surrounding heater wells 62. In the embodiment, the distance between extraction wells 60 is about 4.9 m. A smaller or larger spacing and/or a different well pattern may be utilized in other soil remediation embodiments.

Figure 3:
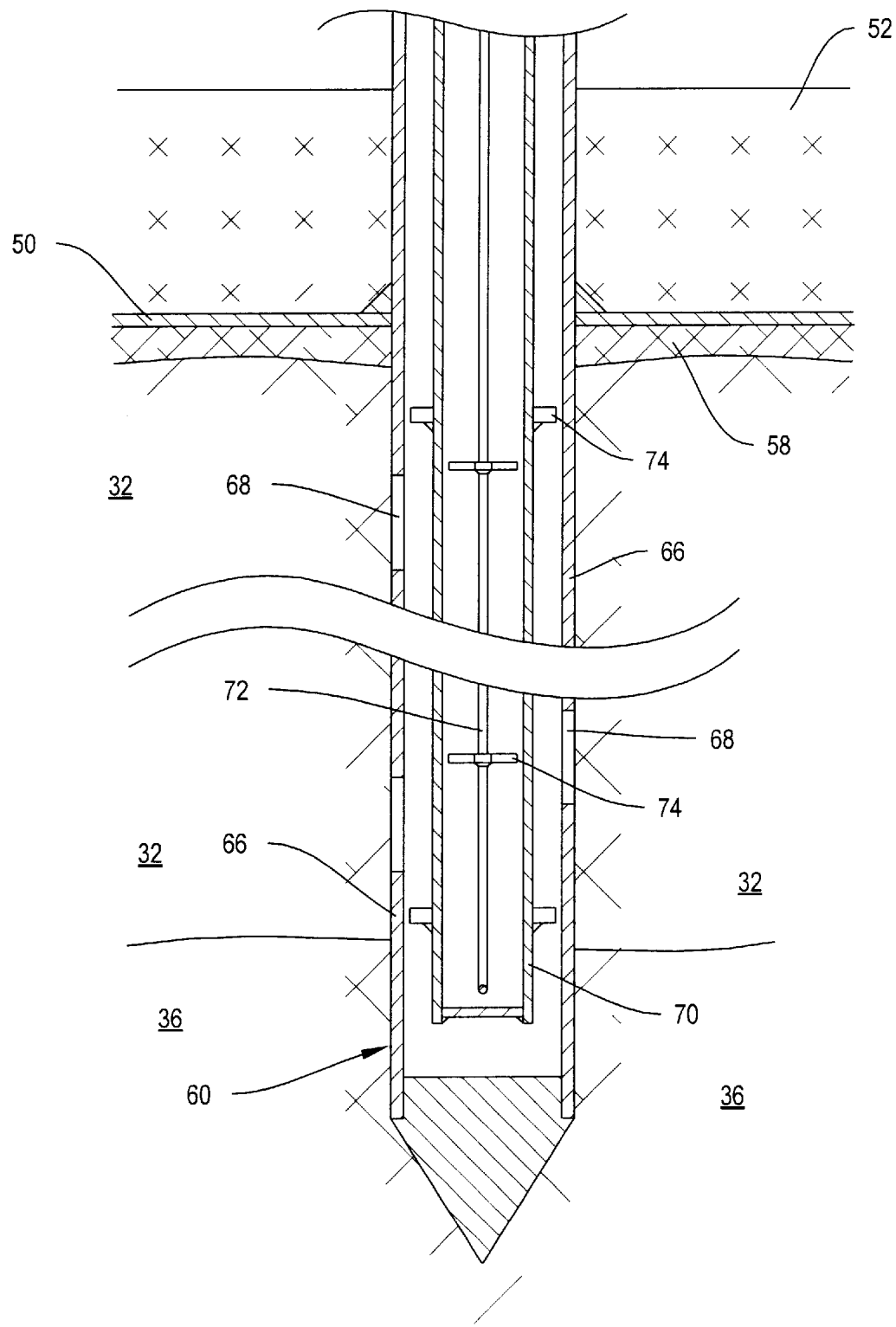
FIG. 3 depicts a cross-sectional representation of an extraction well that includes a heater element.

FIG. 3 depicts a cross-sectional view of a portion of an embodiment of extraction well 60. Casing 66 may include openings 68 adjacent to contaminated soil 32. Openings 68 may allow fluid to flow into casing 66 from soil adjacent to the casing. In alternative embodiments, a portion of an extraction well adjacent to contaminated soil may be an open wellbore, may be screened, or may have other types of entries that allow fluid to flow into the casing. Portions of extraction wells adjacent to non-contaminated, substantially impermeable soil layers may be unperforated. A seal formed by packing, cement, or other type of sealant may be placed at or adjacent to an interface between contaminated soil and uncontaminated soil. The seal may inhibit migration of contamination into the uncontaminated soil along the casing.

Casing 66 for extraction well 60 may include conduit 70 that encloses heater element 72. Conduit 70 may provide corrosion protection for heater element 72. Conduit 70 may be filled with a fluid, such as helium, that promotes heat transfer between heater element 72 and the conduit. Spacers 74 may inhibit conduit 70 from contacting casing 66. Spacers 74 may also inhibit heater element 72 from contacting conduit 70. Heater element 72 may radiatively heat conduit 70, which radiatively heats casing 66. Casing 66 may conductively transfer heat to adjacent soil. Heat transferred to the soil may transfer away from the well primarily by conduction.

FIG. 2 depicts extraction well 60 with an electrically powered heat source, such as a metal strip or mineral insulated cable. Electrical wiring 76 may exit extraction well 60 through side port 78 in the well. Wiring 76 may be coupled to power supply 80 (shown in FIG. 1). In an embodiment of a soil remediation system, the power supply may be a series of transformers that are coupled to an electric grid. The heat source may be used to heat soil adjacent to the extraction well and/or to maintain a temperature of fluid that passes through the extraction well above the single phase temperature of the mercury, water vapor, and/or air mixture. An extraction well with a heat source that heats soil adjacent to the extraction well is a heater-extraction well. Heat sources other than electrically powered heat sources may be used with extraction wells.

Figure 4:
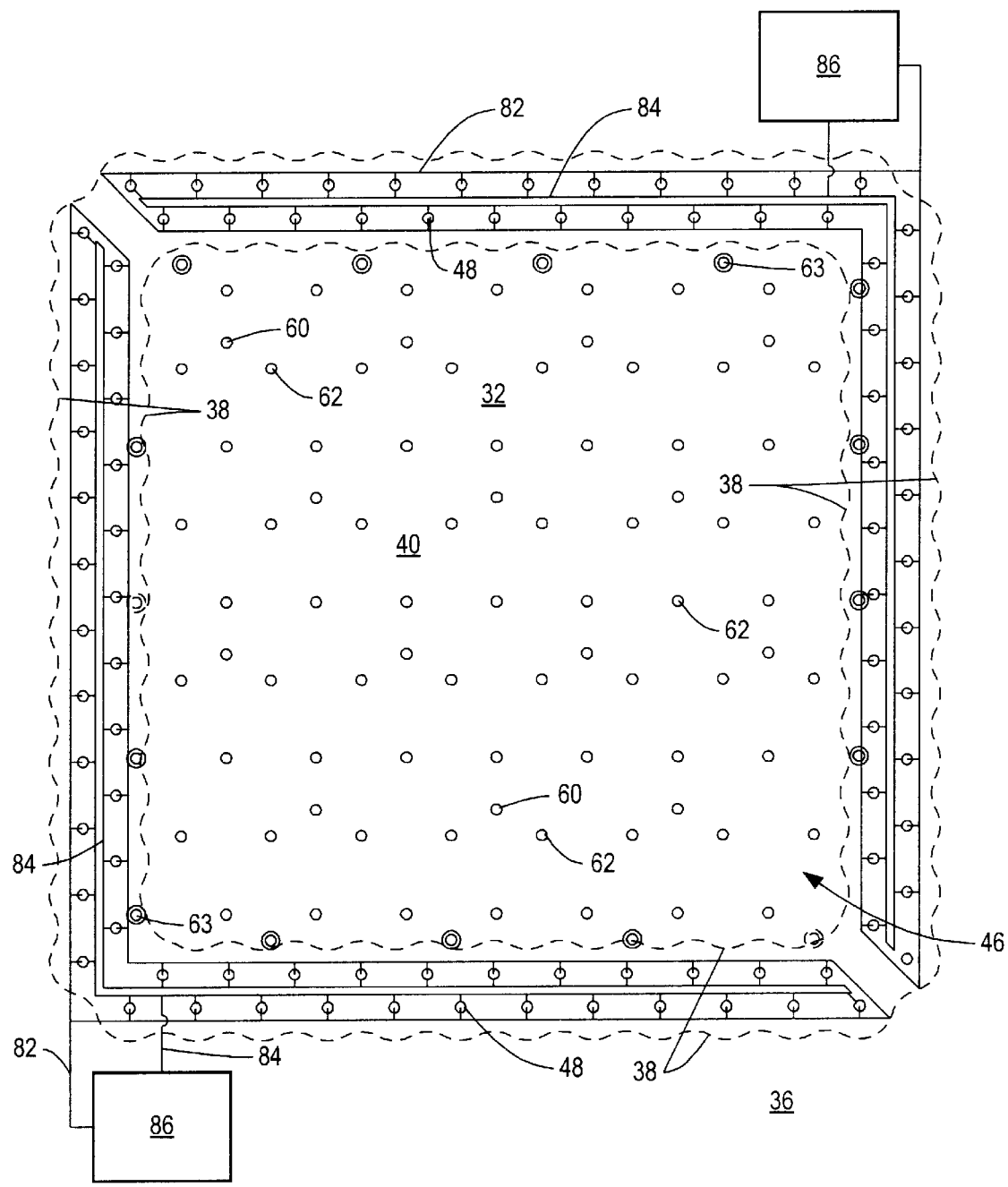
FIG. 4 depicts a plan view of a well pattern for a soil remediation system with extraction wells, some of which do not include heater elements, and a double ring of freeze wells.

In some soil remediation systems, some extraction wells may not include heat sources that allow the extraction wells to heat soil. An extraction well without a heat source may be cheaper to produce and install. An extraction well without a heat source may include heat tracing that inhibits vapor condensation within the extraction well. In a soil remediation system embodiment, extraction wells without heat sources are placed near or at centroids of patterns of surrounding heater wells. For example, an extraction well may be positioned substantially at a centroid of three heater wells that are in an equilateral triangle pattern. FIG. 4 depicts a well pattern wherein extraction wells 60 do not include heat sources that heat the soil. The extraction wells are located at centers of three heater wells 62 arranged in a pattern of equilateral triangles. In the embodiment shown in FIG. 4, heater wells 62 and extraction wells 60 are surrounded by a double ring of freeze wells that form a barrier around a treatment area.

In some soil remediation embodiments, a ring or rings of heater-extraction wells may surround other remediation wells in a treatment area. The heater-extraction wells may inhibit migration of contamination from the treatment area during soil remediation.

The well pattern depicted in FIG. 4 includes a double row of freeze wells 48 that form barrier 38. A circulated heat transfer fluid flows through freeze wells 48 to form and maintain barrier 38. The heat transfer fluid may flow in a closed loop from inlet lines 82 to freeze wells 48, from the freeze wells to outlet lines 84 (shown in FIG. 2), from outlet lines to refrigeration unit 86, and from the refrigeration unit to the inlet lines. In other embodiments, freeze wells may be batch operated units wherein a cryogenic fluid, such as liquid nitrogen, is placed into a freeze well, and heat from the soil transfers to the cryogenic fluid. The cryogenic fluid may be replenished as necessary.

Heater wells 62 (shown in FIG. 1) may apply heat to soil. Heat may be applied to the soil, but is not limited to being applied to the soil, by thermal radiation and/or conduction, by radio frequency heating, and by soil resistivity heating. A heat source for applying radiative heat and/or conductive heat to soil may be an electrical heating element. The heating element may be a metal strip packed in the soil, a metal strip or pipe suspended in a wellbore, a mineral insulated cable, or other type of electrical heating element. In alternative embodiments, a heat source for applying radiative and/or conductive heat to soil may be a heated fluid that is circulated through the heater well, or combustion or other type of exothermic reaction occurring in a wellbore. If mercury contamination is located close to ground surface (i.e., within approximately 1 m of the ground surface), ground heaters may be used to heat the soil instead of heater wells placed into the soil. If the contamination is at a depth that would make contamination removal impractical using ground heaters, heater wells may be placed in trenches in the soil or in wellbores in the soil.

In some soil remediation system embodiments, such as the system illustrated in FIG. 1, both soil remediation wells and ground heaters may be used to remediate the soil. Ground heaters 88 may inhibit condensation of vapors on ground cover 40. Ground heaters 88 may be positioned at selected locations within treatment area 46. Ground heaters 88 may be placed above or below metal sheet layer 50 of ground cover 40. Ground heaters 88 may inhibit off-gas that passes through the ground surface from condensing on ground cover 40 and flowing back into the soil. A portion of vacuum produced by treatment facility 44 may be applied at selected areas under ground cover 40 to draw off-gas that flows out of the soil through the ground surface to a treatment facility.

Heater wells may heat the soil so that temperatures within a treatment area are above a vaporization temperature of mercury within the soil. A vaporization temperature of mercury at one atmosphere of pressure is about 680° F.

(360° C.). A vacuum drawn on soil by a vapor treatment facility may reduce the vaporization temperature of mercury within the soil. The presence of water vapor or air may facilitate the vaporization of mercury. If the soil is contaminated with an additional removable contaminant that has a vaporization temperature above the vaporization temperature of mercury, the heater wells may heat the soil to a temperature above the vaporization temperature of the contaminant.

When a heating system for a treatment area is energized, soil temperature within the treatment area may rise. The rising temperature may increase the partial pressure of mercury and force more mercury into a vapor state. Also, some mercury in the soil may be entrained by other vapor present in the soil, such as water vapor. Heating soil above a vaporization temperature of mercury may allow the mercury to vaporize within the soil. Mercury vapor may be easier to remove from the soil than liquid mercury. Mercury vapor is significantly less dense than liquid mercury, which makes removing mercury vapor significantly easier than removing liquid mercury. Also, heating the soil may significantly increase permeability of the soil and facilitate vacuum induced movement of mercury vapor toward and into an extraction well. Heater wells and/or heater-extraction wells may raise soil temperatures throughout a treatment area to temperatures above the vaporization temperature of mercury at pressure conditions within the soil.

Heater wells may be spaced relatively close together in a pattern to allow heat from several heater wells to superimpose. Heater wells may be placed in substantially uniform patterns throughout a treatment area to promote uniform heating throughout the pattern. Some extraction wells may be placed outside of the pattern to avoid obstructions in the soil. Superposition of heat from several wells may allow the soil to be heated quickly and efficiently to temperatures favorable to remediation of contamination within the soil, including mercury. Heater wells and other wells within a treatment area may be placed in any desired pattern. Heater wells may be placed in triangular patterns, rectangular patterns, pentagonal patterns, hexagonal patterns, or higher order polygon patterns. A spacing between heater wells may be a factor in determining an amount of time needed to heat the treatment area to a desired temperature. A close spacing may require less remediation time, but many wells, well installation costs and system operating costs may make close spacing prohibitively expensive. A spacing between heater wells may range from about 0.6 to about 9.1 m or more. In an embodiment, a spacing between heater wells positioned in a hexagonal pattern with a heater-extraction well positioned at a center of each hexagon is about 2.4 m. A larger or smaller spacing and/or different patterns may be used to accommodate specific site properties and conditions.

Heater wells, thermal blankets, and/or heater-extraction wells may operate at temperatures ranging from about 540° C. to about 870° C. Heater wells, thermal blankets, and/or heater-extraction wells may be operated at higher or lower temperatures to meet specific operating needs of a remediation site. Off-gas removed from the soil may pass adjacent to heaters. At some soil remediation sites, highly toxic dimethyl mercury may be present in the soil or may be formed during remediation as the soil temperature begins to rise due to heat and the presence of hydrocarbons in the soil. Off-gas may pass adjacent to heaters as the off-gas is removed from the soil. The heaters may raise a temperature of off-gas above a decomposition temperature of dimethyl mercury. A residence time of off-gas at temperatures above decomposition temperatures of dimethyl mercury may allow for thermal destruction of all or substantially all dimethyl mercury removed from the soil. Mercury within the off-gas may be condensed as elemental mercury to avoid formation of dimethyl mercury or other mercury compounds after removal of the off-gas from the soil.

Injection wells may be used to introduce fluid into the soil. An injection well may include a casing. A portion of the casing may include perforations, screening, or other type of openings that allow fluid to pass from the injection well into the soil. A portion of a wellbore of an injection well may be an open wellbore without a casing. Selected extraction wells may be converted to injection wells by disconnecting the wells from a vacuum source and coupling the wells to a fluid metering system that introduces the drive fluid into the soil.

A fluid introduced into soil through an injection well may be a drive fluid and/or a reactant. A drive fluid may be, but is not limited to, water, steam, air, oxygen, nitrogen, carbon dioxide, or combinations thereof. A reactant may react with contaminants (e.g., hydrocarbon contaminants) in the soil to form non-contaminants or volatile products. A reactant may be, but is not limited to, oxygen, air, and/or hydrogen peroxide.

Fluid may be injected into the soil through injection wells by pumps. In other soil remediation system embodiments, vacuum applied to the soil by a treatment facility may draw fluid placed in injection wells into the soil. In a soil remediation system embodiment, extraction wells adjacent to a barrier are used as injection wells near an end of a soil remediation process. A drive fluid may be injected or drawn into the extraction wells that are to be used as injection wells. The drive fluid may mobilize contamination remaining in the soil to extraction wells. The process may be repeated using the next inner ring of extraction wells until drive fluid is introduced into wells surrounding an innermost ring of extraction wells in the treatment area. In an alternative soil remediation system, a drive fluid may be introduced into an innermost ring of extraction wells that are converted to injection wells, and the drive fluid is produced from remaining extraction wells. The process may be repeated until the drive fluid is introduced into the soil from a ring of extraction wells adjacent to extraction wells abutting a barrier. In some soil remediation systems, injection wells may not be used.

Test wells 64, shown in FIG. 1, may be used to measure soil properties. Temperature sensors may be placed in test wells. Temperature sensors may be, but are not limited to, thermocouples or resistance temperature detectors (RTD). An RTD may provide accuracy and stability over a wide temperature range, including temperatures near a vaporization temperature of mercury. Test well 34 may include more than one temperature sensor. The position of the temperature sensors in test wells may be adjustable to measure temperature within the soil as a function of depth.

Samples may be taken from the soil during soil remediation to monitor soil remediation progress. Neutron logging tool 90 (shown in a test well 64 in FIG. 1) may be placed within test wells 64 to monitor soil remediation progress during remediation. Neutron logging tool 90 may be moved to various test wells to monitor soil remediation at different location within and adjacent to a treatment area.

Vapor collection system 42 (also shown in FIG. 2) may transport off-gas removed from soil to treatment facility 44. An embodiment of vapor collection system 42 may include risers 92, conduits 94, and manifold 96.

As shown in FIG. 2, riser 92 may be coupled to heater-extraction well 63 and conduit 94. Riser 92 may be heated with an internal heater and/or external heat tracing to maintain a temperature within the riser above a boiling temperature of mercury. Riser 92 may be thermally insulated to reduce heat loss. A temperature within vapor collection system conduit 94 may be allowed to fall below the boiling temperature of mercury. The height provided by riser 92 and a slope of conduit 94 and a manifold may allow mercury that condenses within conduit 94 and manifold to flow by gravity through the conduit and manifold to a treatment facility. Risers 92 may extend 1 m or more above the ground surface.

In some embodiments, risers may be sealed to a ground cover around an opening in the ground cover so that a vacuum may be drawn at the ground surface. A vapor collection system for a soil remediation system that does not include extraction wells may include risers that are sealed to openings in a ground cover. Off-gas removed from the soil may be transported through the risers, through conduits, and through a manifold to a treatment facility.

Riser 92 may be metal pipe. Conduits 94 may be a combination of metal pipe, flexible hose, and/or plastic piping. The material used in a specific portion of conduit 94 may be determined based on a temperature that the specific portion of conduit will reach during use. A portion of conduit 94 near riser 92 may be made of metal or high temperature flexible hose. A portion of conduit 94 located a distance away from the riser may be at a temperature low enough to allow the conduit to be formed of plastic pipe. In some vapor collection system embodiments, some conduits from risers may include liquid or air cooled heat exchangers that promote rapid cooling of off-gas and condensation of mercury. A manifold of a vapor collection system may be formed of metal or plastic piping.

Several extraction wells may be coupled to a single riser. The riser may also be sealed to an opening through a ground cover so that a vacuum is drawn on the soil below the ground cover. Several such extraction wells and riser combinations may be located within a treatment area. Conduits leading from the extraction wells to the risers may be heated to inhibit condensation of off-gas within the conduits.

As shown in FIG. 1, a soil remediation system may include treatment facility 44. Treatment facility 44 may include vacuum system 98 and contaminant treatment system 100. Vacuum system 98 may be coupled to vapor collection system 42. The vacuum provided by vacuum system 98 may draw off-gas from the soil.

Figure 5:
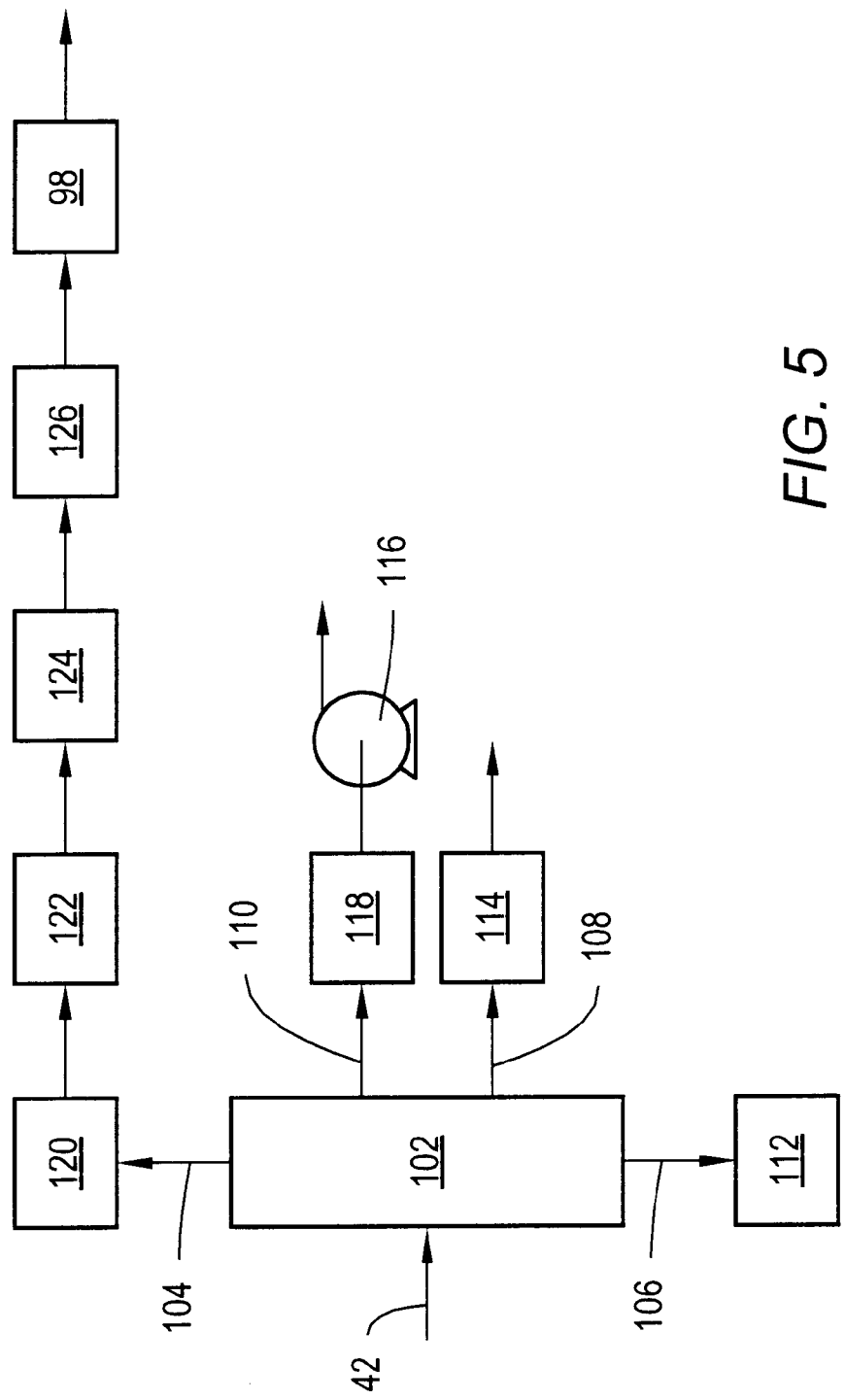
FIG. 5 depicts a schematic diagram of a contamination treatment facility.

FIG. 5 shows a schematic diagram of an embodiment of a treatment facility. The treatment facility may eliminate or reduce an amount of contaminants in off-gas removed from the soil. Off-gas removed from the soil may pass through a vapor collection system to separation unit 102. Separation unit 102 may separate the off-gas into vapor stream 104 and a liquid stream. The liquid stream may be further separated into mercury stream 106, non-aqueous stream 108 and aqueous stream 110. Mercury stream 106 may be transported to mercury purifier 112. Mercury purifier 112 may be located at the remediation site, or the mercury purifier may be an off-site facility.

Non-aqueous stream 108 may include oils and other non-aqueous material. Non-aqueous stream 108 may be very small compared to aqueous stream 110. Non-aqueous stream 108 may be sent to treatment unit 114. Treatment unit 114 may place the non-aqueous stream in storage containers, such as waste barrels. The containers may be transported off-site for disposal. Alternatively, treatment unit 114 may be an oxidizer or other type of reactor system that destroys or substantially destroys organic non-aqueous stream 108.

Aqueous stream 110 may be moved by pump 116 through treatment unit 118. The treatment unit may be an activated carbon bed or other type of system that removes or reduces contamination within the aqueous stream. The remaining aqueous stream may be discharged. For example, after passing the aqueous stream through an activated carbon bed, the aqueous stream may be sent to a sanitary sewer.

Vapor stream 104 may pass through sulfur-coated carbon bed 120, through thermal oxidizer 122, and/or through activated carbon bed 124. Sulfur-coated carbon bed 120 may chemically react with mercury vapors and some contaminants to form solid compounds. The solid compounds may be removed from the stream by filtration or other separation technique. Thermal oxidizer 122 may destroy a significant portion (over 99.9999%) of remaining contaminants within vapor stream 104. An exit stream from thermal oxidizer 122 may pass through heat exchanger 126, activated carbon bed 124 and through vacuum system 98. Heat exchanger 126 may reduce a temperature of the stream exiting the thermal oxidizer before the stream enters vacuum system 98. Activated carbon bed 124 may remove remaining hydrocarbons within the vapor stream to acceptable levels. Vacuum system 98 may vent the remaining stream to the atmosphere.

In some soil remediation system embodiments for mercury contaminated soil, a sulfur-coated carbon bed and/or a thermal oxidizer may not be needed. Removing mercury present in the off-gas by condensation in separators 102 may make a mercury reaction system, such as a sulfur-coated carbon bed, unnecessary. In soil remediation system embodiments that use freeze wells with circulated refrigerant, a portion of the output of a refrigerant unit may be used in a heat exchanger to significantly reduce the temperature of the off-gas stream so that substantially all mercury within the stream is condensed out of the stream. Activated carbon bed 124 or activated carbon beds may be sufficient to remove contaminants within a vapor stream to acceptable levels so that a thermal oxidizer is not needed. Eliminating the use of a thermal oxidizer may improve economics of soil remediation by eliminating large capital cost, operation costs, transportation costs and labor costs associated with the thermal oxidizer.

To install an embodiment of an ISTD soil remediation system that utilizes wells placed in the soil, such as the system depicted in FIG. 1, fill material 58 such as sand and/or gravel (shown in FIGS. 2 and 3) may be placed and graded to level treatment area 46. Metal layer 50 of ground cover 40 may be formed over treatment area 46 by joining metal sheets together. Barrier 38 may be formed around treatment area 46. Barrier 38 may be sealed to metal layer 50 of ground cover 40. In an embodiment, barrier 38 is a freeze wall formed by freeze wells. Formation of the freeze wall may be started before heating the soil so that the barrier is fully formed when the soil is heated. Other types of barriers may also be used. Such barriers may be, but are not limited to, interconnected metal sheets or a grout wall.

Openings in metal sheets 50 may be formed for wells and/or for risers 92 that allow a vacuum to be drawn at the ground surface. Wells may be vibrationally inserted into the soil. The wells may be heater wells 62, extraction wells 60, and/or heater-extraction wells 63. Test wells 64 may also be positioned within the soil. A walkway system may be formed to provide access to selected test wells 64 so that samples may be taken from the test wells, or so that logging tools may be placed in the test wells during remediation. All wells of the soil remediation system maybe sealed to metal layer 50. Risers 92 may be coupled to extraction wells 60 and/or heater-extraction wells 63. Risers 92 may also be sealed to openings in the ground cover to allow vacuum to be drawn on the soil surface during remediation. Conduits 94 may connect risers 92 to manifold 96. Manifold 96 may be coupled to treatment facility 44. Risers 92 may include internal heaters and/or external heat tracing to allow fluid flowing through the risers to be maintained above a temperature at which mercury condenses. Risers 92 may be insulated to inhibit heat loss. Ground heaters 88 may be placed on metal layer 50 at selected locations between wells.

Heater wells 62, heater-extraction wells 60, 62 ground heaters 88, and/or risers 92 may be coupled to energy sources. The energy source may be a transformer that is coupled to an electric grid. As shown in FIGS. 2 and 3, insulation 52 may be placed on top of metal layer 50 of ground cover 40. Impermeable ground cover layer 54 may be placed over insulation 52. Impermeable ground cover layer 54 may be sealed to risers 92 and to barrier 38. Impermeable layer 54, depicted in FIG. 2, may be sloped to promote runoff. Heater wells 62, extraction wells 60, test wells 64, heat tracing of risers 92, and treatment facility 44, shown in FIG. 1, may be electrically connected to a control system. Vacuum system 98 of treatment facility 44 may be engaged to draw fluid out of the soil. The heaters may be activated to heat the soil.

During an initial period of heating, off-gas removed from the soil may contain mostly water vapor, air, and low boiling point hydrocarbons. The off-gas may also include some mercury that is entrained in the vapor. As soil temperature increases above a vaporization temperature of water within the soil, an amount of water vapor in the off-gas may begin to diminish and an amount of mercury within the off-gas may increase. As the soil temperature increases above the vaporization temperature of mercury within the soil, the amount of mercury in the off-gas may begin to decrease since a large portion of the mercury in the soil may have already vaporized and left the soil through extraction wells. The soil may be further heated or maintained at a temperature above the vaporization temperature of mercury within the soil to reduce mercury within the soil to a desired concentration. The mercury concentration within the soil may be determined during remediation by testing samples taken from a test well and/or by using a neutron logging tool.

Figure 6:
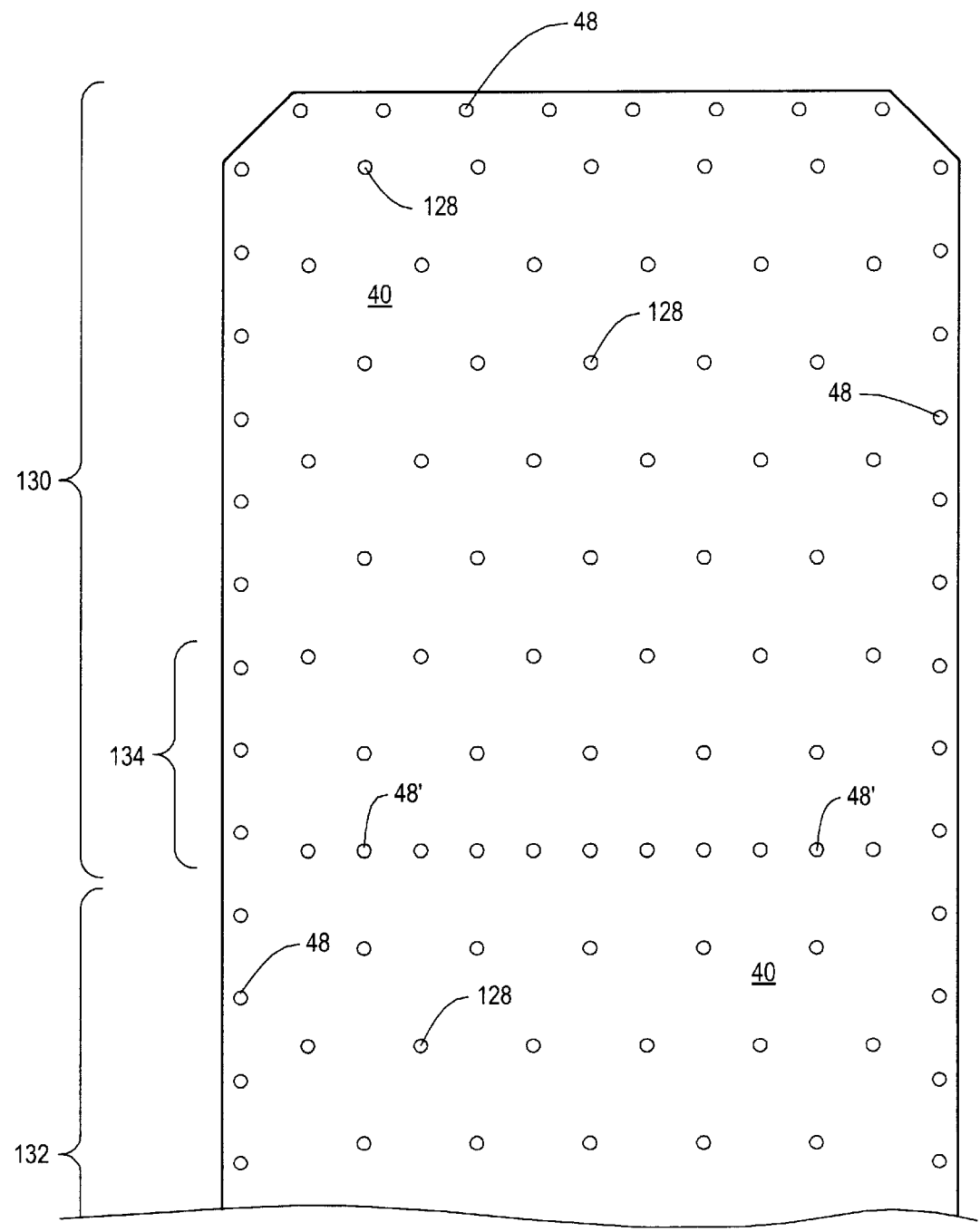
FIG. 6 depicts a plan view of well patterns for freeze wells and soil remediation wells that may be used to treat a large contaminated area of soil.

A large area of soil contamination may be treated in sections. FIG. 6 depicts a plan view of freeze wells 48 and soil remediation wells 128 that may be used to treat a long strip of contaminated soil. Freeze wells 48 may be formed along a first end and sides of a portion of the length of the contaminated soil strip to define first zone 130. Freeze wells 48 may be placed in uncontaminated, or substantially uncontaminated soil that is adjacent to the contaminated soil. Soil remediation wells 128 may be inserted into first zone 130. Patterns of freeze wells 48 and soil remediation wells 128 maybe extended into second zone 132 that abuts first zone 130. Soil remediation wells 128 may be coupled to a treatment facility. Ground cover 40 may be installed over first zone 130. A ground cover may also be installed over second zone 132.

In an embodiment, freeze wells 48' may be placed between first zone 130 and second zone 132 so that the freeze wells form a frozen separation barrier between the first zone and the second zone. Spacing between soil remediation wells 128 and spacing between freeze wells 48' that form the separation barrier may be, or may be adjusted to be, convenient multiples so that some or all of the freeze wells that form the separation barrier may be converted to soil remediation wells that fit within a pattern of soil remediation wells. Wellbores for freeze wells 48' that form separation barriers may be formed in the soil at selected intervals along the length of the contaminated soil to define treatment zones that will result in the remediation of the entire length of contaminated soil.

In an alternative embodiment, a metal sheet barrier may be inserted or a grout wall may be formed in the soil between a first zone and a second zone. The separation barrier may advantageously inhibit or substantially inhibit fluid transport between the first and second zones, while allowing all of the soil up to the barrier to be remediated. A portion of heat applied in the first zone near the separation barrier may transfer across the barrier into the second zone. The separation barrier may be formed so that the barrier does not interfere with a pattern of freeze wells and/or soil remediation wells. Metal barriers may be inserted, or grout walls may be formed, at selected intervals along the length of the contaminated soil to define treatment zones that will result in the remediation of the entire length of contaminated soil. In some embodiments, a barrier around the contaminated soil may be an inserted metal barrier or grout wall instead of freeze wells.

Freeze wells 48 in first zone 130 may be activated to form a frozen barrier around the first zone. Soil within first zone 130 may be remediated using soil remediation wells 128 after formation of the frozen barrier. When remediation of first zone 130 nears completion, freeze wells of second zone 132 may be activated to extend a frozen barrier along a length of the contaminated soil. After completing remediation of first zone 130, some of the freeze wells, including freeze wells 48' that form the separation barrier, may be deactivated. Some of freeze wells 48 and some of soil remediation wells 128 in section 134 of first zone 130 may remain activated. After formation of the extended frozen barrier, soil remediation wells 128 in second treatment zone 132 may be activated. If the separating barrier between first zone 130 and second zone 132 is a frozen barrier, activated soil remediation wells 128 of the first zone and soil remediation wells 128 of the second zone may destroy the separating frozen barrier. Some or all of freeze wells 48' that formed the separation barrier may be converted to soil remediation wells after deactivating the freeze wells. Activated soil remediation wells 128 and freeze wells 48 in section 134 may inhibit migration of fluid beyond the activated wells. Additional zones may be treated by extending the pattern of wells along the length of the contaminated soil until all of the contaminated soil is treated.

An advantage of a soil remediation system is that the system may use a neutron logging tool. The neutron logging tool may be used to provide in situ measurements of mercury concentration before, during and after soil remediation. The use of a neutron logging tool may advantageously minimize the need to take, keep, and analyze core samples; provide the ability to measure very low mercury concentrations; provide the ability to take measurements before, during, and after soil remediation at various depths in the soil; provide the ability to average large sample volumes to reduce statistical variations; and help to minimize or eliminate worker exposure to contaminants within the soil being treated.

An advantage of an ISTD soil remediation system for treatment of mercury contaminated soil is that the system heats the soil and substantially uniformly increases the permeability of the soil throughout a treatment area. The increase in soil permeability may allow removal of soil contaminants throughout the treatment area. The increase in soil permeability caused by soil heating may allow the treatment area to be remediated without each well of the soil remediation system being an extraction well.

An advantage of an ISTD soil remediation system for treatment of mercury contaminated soil is that extraction wells of the system remove mercury from the soil as a vapor. The mercury vapor may be condensed as elemental mercury after removal from the soil without significant formation of mercury compounds. Removal of mercury as a vapor may allow reduction of mercury in the soil to extremely low residual levels. An ISTD soil remediation system may reduce mercury contamination within soil to concentrations below 10 parts per million.

An advantage of an ISTD soil remediation system for treatment of mercury contaminated soil is that the soil remediation system may remove or reduce other contaminants present within the soil as well as mercury. Further advantages of using an ISTD soil remediation system to treat mercury contaminated soil may include that the system is safe, economic, sturdy, durable, simple, efficient, and reliable; yet the system may also be easy to assemble, install, and use.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method of remediating mercury contaminated soil, comprising:

heating soil within a treatment area to vaporize mercury within the soil;

removing vaporized mercury and off-gas from the soil;

elevating the vaporized mercury and off-gas in a heated riser, wherein a portion of the vaporized mercury is allowed to condense in the conduit and flow by gravity to the treatment facility; and transporting the vaporized mercury and off-gas to a treatment facility through a conduit.

2. The method of claim 1, further comprising separating mercury from the off-gas in the treatment facility.

3. The method of claim 2, further comprising treating the off-gas to reduce contamination within the off-gas.

4. The method of claim 1, wherein the vaporized mercury is maintained in the vapor state while passing through the conduit from the riser to the treatment facility.

5. The method of claim 1, wherein heating the soil comprises inserting heater wells into the soil and heating the heater wells.

6. The method of claim 1, wherein heating the soil comprises using ground heaters to heat the soil.

7. The method of claim 1, wherein removing vaporized mercury from the soil comprises drawing mercury vapor from the soil into an extraction well coupled to the riser.

8. The method of claim 7, wherein the extraction well includes a heater element configured to heat soil adjacent to the extraction well.

9. The method of claim 1, wherein removing vaporized mercury from the soil comprises drawing a vacuum at ground surface through the riser.

10. The method of claim 1, further comprising monitoring mercury concentration within the soil during remediation using a neutron logging tool.

11. The method of claim 1, further comprising injecting a drive fluid into the soil within the treatment area, and producing a portion of the fluid from the soil.

12. The method of claim 1, further comprising forming a barrier around a portion of a perimeter of the treatment area, extending the barrier to surround a second treatment area, heating soil within the second treatment area, and removing vaporized mercury and off-gas from the soil in the second treatment area.

13. The method of claim 12, wherein a portion of the barrier comprises a frozen barrier.

14. The method of claim 12, wherein a portion of the barrier comprises a grout wall.

15. The method of claim 12, wherein a portion of the barrier comprises a sheet pile.

16. The method of claim 12, further comprising heating less than all of the soil of the treatment area adjacent to the second treatment area when heating soil within the second treatment area, and removing off-gas from a portion of the treatment area adjacent to the second treatment area simultaneously with removing vaporized mercury and off-gas from the soil in the second treatment area.

17. A method for remediating mercury contaminated soil, comprising:

establishing a barrier around a portion of a perimeter of the contaminated soil;

placing a cover over the treatment area;

heating the soil within the treatment area;

removing off-gas from the soil through extraction wells;

elevating the off-gas in heated risers;

transporting the off-gas from the heated risers through conduits to a treatment facility, wherein a portion of the mercury within the off-gas is allowed to condense within the conduits and flow by gravity to the treatment facility.

18. The method of claim 17, further comprising drawing a vacuum at ground surface.

19. The method of claim 17, further comprising monitoring mercury concentration within the soil during removal of off-gas from the soil using a neutron logging tool.

20. The method of claim 17, further comprising converting a ring of extraction wells to injection wells, inserting a drive fluid into the soil through the injection wells, and converting the ring of injection wells back to extraction wells.

21. The method of claim 17, wherein establishing the barrier comprises inserting freeze wells into the ground and initiating the freeze wells to cool the soil to freeze water within the soil and form a frozen barrier.

22. The method of claim 17, wherein establishing the barrier comprises inserting metal sheet into the ground around the portion.

23. The method of claim 17, wherein establishing the barrier comprises forming a grout wall in the ground around the portion.

24. The method of claim 17, wherein the cover comprises a metal sheet layer.

25. The method of claim 17, wherein the cover comprises a metal sheet layer and insulation.

26. The method of claim 17, wherein the cover comprises a metal sheet layer and an impermeable layer.

27. The method of claim 17, wherein the cover comprises a metal sheet layer and an impermeable layer, and wherein a vacuum is drawn between the metal sheet layer and the impermeable layer.

28. The method of claim 17, further comprising extending the barrier to surround a second treatment area, heating soil within the second treatment area, and removing off-gas from the soil in the second treatment area.

29. The method of claim 28, further comprising heating less than all of the soil of the treatment area adjacent to the second treatment area when heating soil within the second treatment area, and removing off-gas from a portion of the treatment area adjacent to the second treatment area simultaneously with removing off-gas from the soil in the second treatment area.

30. The method of claim 17, wherein a portion of the conduits comprise flexible tubing.

31. The method of claim 17, wherein a portion of the conduits comprise plastic piping.

32. The method of claim 17, wherein the treatment facility comprises a carbon-sulfur bed configured to react with mercury vapor.

33. The method of claim 17, wherein the treatment facility comprises a thermal oxidizer.

34. A method of remediating mercury contaminated with soil, comprising:
heating soil within a treatment area to vaporize mercury within the soil;
removing vaporized mercury and off-gas from the soil;
elevating the vaporized mercury and off-gas in a riser;
transporting the vaporized mercury and off-gas to a treatment facility through a conduit;
forming a barrier around a portion of the treatment area;
extending the barrier to surround a second treatment area;
heating soil within the second treatment area to vaporize mercury within the soil in the second treatment area; and
removing vaporized mercury and off-gas from the soil in the second treatment area.

35. The method of claim 34, further comprising monitoring mercury concentration within the soil during remediation using a neutron logging tool.

36. The method of claim 34, wherein a portion of the barrier comprises a frozen barrier.

37. The method of claim 34, wherein a portion of the barrier comprises a grout wall.

38. The method of claim 34, wherein a portion of the barrier comprises a sheet pile.

39. The method of claim 34, further comprising heating less than all of the soil of the treatment area adjacent to the second treatment area when heating the soil within the second treatment area, and removing off-gas from a portion of the treatment area adjacent to the second treatment area simultaneously with removing vaporized mercury and off-gas from the soil in the second treatment area.

40. A method for remediating mercury contaminated soil, comprising:
establishing a barrier around a portion of a perimeter of the contaminated soil;
placing a cover over the treatment area;
heating the soil within the treatment area;
removing off-gas from the soil through extraction wells;
transporting the off-gas from the extraction wells through conduits to a treatment facility, wherein a portion of the mercury within the off-gas is allowed to condense within the conduits and flow by gravity to the treatment facility;
extending the barrier to surround a second treatment area;
heating soil within the second treatment area; and
removing off-gas from the soil in the second treatment area.

41. The method of claim 40, wherein a portion of the vaporized mercury is allowed to condense in the conduit and flow by gravity to the treatment center.

42. The method of claim 40, wherein the vaporized mercury is maintained in the vapor state while passing through the conduit from the riser to the treatment facility.

43. The method of claim 40, further comprising monitoring mercury concentration within the soil during removal of off-gas from the soil using a neutron logging tool.

44. The method of claim 40, wherein a portion of the barrier comprises a frozen barrier.

45. The method of claim 40, wherein a portion of the barrier comprises a grout wall.

46. The method of claim 40, wherein a portion of the barrier comprises a sheet pile.

47. The method of claim 40, further comprising converting a ring of extraction wells to injection wells, inserting a drive fluid into the soil through the injection wells, and converting the ring of injection wells back to extraction wells.

48. The method of claim 40, wherein the cover comprises a metal sheet layer and an impermeable layer, and wherein a vacuum is drawn between the metal sheet layer and the impermeable layer.

49. The method of claim 40, further comprising heating less than all of the soil of the treatment area adjacent to the second treatment area when heating the soil within the second treatment area, and removing off-gas from a portion of the treatment area adjacent to the second treatment area simultaneously with removing off-gas from the soil in the second treatment area.

50. The method of claim 40, further comprising heating less than all of the soil of the treatment area adjacent to the second treatment area when heating soil within the second treatment area, and removing off-gas from a portion of the treatment area adjacent to the second treatment area simultaneously with removing vaporized mercury and off-gas from the soil in the second treatment area.

51. A method of remediating mercury contaminated soil, comprising:

heating soil within a treatment area to vaporize mercury within the soil;

removing vaporized mercury and off-gas from the soil;

elevating the vaporized mercury and off-gas in a heated riser; and transporting the vaporized mercury and off-gas to a treatment facility through a conduit wherein a portion of the vaporized mercury is allowed to condense in the conduit and flow by gravity to the treatment facility.

52. The method of claim 51, further comprising monitoring mercury concentration within the soil during removal of off-gas from the soil using a neutron logging tool.

53. The method of claim 51, further comprising forming a barrier around a portion of a perimeter of the treatment area, extending the barrier to surround a second treatment area, heating soil within the second treatment area, and removing vaporized mercury and off-gas from the soil in the second treatment area.

54. The method of claim 53, wherein a portion of the barrier comprises a frozen barrier.

55. The method of claim 53, wherein a portion of the barrier comprises a grout wall.

56. The method of claim 53, wherein a portion of the barrier comprises a sheet pile.

57. The method of claim 53, further comprising heating less than all of the soil of the treatment area adjacent to the second treatment area when heating soil within the second treatment area, and removing off-gas from a portion of the treatment area adjacent to the second treatment area simultaneously with removing vaporized mercury and off-gas from the soil in the second treatment area.

* * * * *